United States Patent
Wu et al.

(10) Patent No.: US 12,382,455 B2
(45) Date of Patent: Aug. 5, 2025

(54) TECHNIQUES FOR INTERFERENCE CANCELLATION IN SIDELINK COMMUNICATION

(71) Applicant: QUALCOMM Incorporated, San Diego, CA (US)

(72) Inventors: Shuanshuan Wu, San Diego, CA (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 468 days.

(21) Appl. No.: 17/838,008

(22) Filed: Jun. 10, 2022

(65) Prior Publication Data

US 2023/0403707 A1  Dec. 14, 2023

(51) Int. Cl.
*H04W 72/20* (2023.01)
*H04W 72/56* (2023.01)

(52) U.S. Cl.
CPC ........... *H04W 72/20* (2023.01); *H04W 72/56* (2023.01)

(58) Field of Classification Search
None
See application file for complete search history.

(56) References Cited

U.S. PATENT DOCUMENTS

| | | | | |
|---|---|---|---|---|
| 10,985,879 | B2* | 4/2021 | Wu | H04L 1/1861 |
| 2021/0337509 | A1* | 10/2021 | Selvanesan | H04W 72/30 |
| 2022/0110096 | A1* | 4/2022 | Lin | H04W 74/0808 |
| 2023/0141004 | A1* | 5/2023 | Hong | H04W 72/1263 370/311 |
| 2023/0345423 | A1* | 10/2023 | Dong | H04W 72/02 |
| 2023/0362934 | A1* | 11/2023 | Grieco | H04W 76/11 |
| 2024/0224297 | A1* | 7/2024 | Shin | H04W 76/14 |

* cited by examiner

*Primary Examiner* — Xavier S Wong
(74) *Attorney, Agent, or Firm* — Dalei Dong; Holland & Hart LLP

(57) ABSTRACT

Methods, systems, and devices for wireless communication are described. A user equipment (UE) may generate sidelink assistance information based on an interference condition associated with an initial transmission of sidelink communication over a sidelink resource of a sidelink resource pool. The sidelink assistance information may include information associated with the interference condition. The UE may transmit an inter-UE coordination message including the generated sidelink assistance information. Additionally, or alternatively, a UE may receive inter-UE coordination message including sidelink assistance information. The UE may receive a retransmission of the sidelink communication and decode the received retransmission of the sidelink communication based on the received inter-UE coordination message including sidelink assistance information.

29 Claims, 12 Drawing Sheets

Coordination Message 210

Unreserved Sidelink Resources 305

Reserved Sidelink Resources 310

TECHNIQUES FOR INTERFERENCE CANCELLATION IN SIDELINK COMMUNICATION

FIELD OF DISCLOSURE

The following relates to wireless communication, including techniques for interference cancellation for sidelink communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for interference cancellation in sidelink communication. Various aspects of the present disclosure relate to enabling a UE to share inter-UE coordination information for interference cancellation for sidelink communications. According to one aspect, a UE may support sharing inter-UE coordination information based on a request for the inter-UE coordination information including sidelink assistance information. According to another aspect, the UE may support sharing inter-UE coordination information based on a condition to share the inter-UE coordination information including sidelink assistance information.

A method for wireless communication at a UE is described. The method may include generating sidelink assistance information based on an interference condition associated with an initial transmission of sidelink communication over a sidelink resource of a sidelink resource pool, the sidelink assistance information including information associated with the interference condition and transmitting an inter-UE coordination message including the generated sidelink assistance information.

An apparatus for wireless communication at a UE is described. The apparatus may include a processor, memory coupled with the processor, and instructions stored in the memory. The instructions may be executable by the processor to cause the apparatus to generate sidelink assistance information based on an interference condition associated with an initial transmission of sidelink communication over a sidelink resource of a sidelink resource pool, the sidelink assistance information including information associated with the interference condition and transmit an inter-UE coordination message including the generated sidelink assistance information.

Another apparatus for wireless communication at a UE is described. The apparatus may include means for generating sidelink assistance information based on an interference condition associated with an initial transmission of sidelink communication over a sidelink resource of a sidelink resource pool, the sidelink assistance information including information associated with the interference condition and means for transmitting an inter-UE coordination message including the generated sidelink assistance information.

A non-transitory computer-readable medium storing code for wireless communication at a UE is described. The code may include instructions executable by a processor to generate sidelink assistance information based on an interference condition associated with an initial transmission of sidelink communication over a sidelink resource of a sidelink resource pool, the sidelink assistance information including information associated with the interference condition and transmit an inter-UE coordination message including the generated sidelink assistance information.

Some examples of the method, apparatuses, and non-transitory computer-readable medium described herein may further include operations, features, means, or instructions for receiving a request for the sidelink assistance information and where transmitting the inter-UE coordination message including the sidelink assistance information may be based on the request for the sidelink assistance information.

Some examples of the method, apparatuses, and non-transitory computer-readable medium described herein may further include operations, features, means, or instructions for receiving sidelink control information (SCI), a medium access control-control element (MAC-CE), or a radio resource control (RRC) message, or a combination thereof and where the SCI, the MAC-CE, or the RRC message includes the request for the sidelink assistance information.

Some examples of the method, apparatuses, and non-transitory computer-readable medium described herein may further include operations, features, means, or instructions for receiving a physical sidelink feedback channel (PSFCH) during a PSFCH occasion, the PSFCH carrying the request for the sidelink assistance information.

In some examples of the method, apparatuses, and non-transitory computer-readable medium described herein, the request identifies a time and frequency resource location associated with a decoding failure of the initial transmission of the sidelink communication.

In some examples of the method, apparatuses, and non-transitory computer-readable medium described herein, the request identifies a cyclic redundancy check value, a modulation order, a modulation and coding scheme (MCS), a resource allocation, a reference signal pattern, an offset value, or any combination thereof, associated with a different transmission of a different sidelink communication that overlaps with the initial transmission of the sidelink communication over the sidelink resource of the sidelink resource pool.

In some examples of the method, apparatuses, and non-transitory computer-readable medium described herein, the interference condition corresponds to one or more different transmissions of different sidelink communications that overlap with the initial transmission of the sidelink transmission over the sidelink resource of the sidelink resource pool.

Some examples of the method, apparatuses, and non-transitory computer-readable medium described herein may further include operations, features, means, or instructions for receiving a different transmission of a different sidelink communication over the sidelink resource of the sidelink resource pool, the different transmission of the different sidelink communication corresponding to the interference condition associated with the initial transmission of the sidelink communication over the sidelink resource of the sidelink resource pool and where generating the sidelink assistance information may be based on the different transmission of the different sidelink communication corresponding to the interference condition associated with the initial transmission of the sidelink communication.

Some examples of the method, apparatuses, and non-transitory computer-readable medium described herein may further include operations, features, means, or instructions for determining a set of multiple different transmissions of different sidelink communication overlapping with the initial transmission of the sidelink communication or one or more future transmissions of the sidelink communication over one or more sidelink resources of the sidelink resource pool and where generating the sidelink assistance information may be based on the set of multiple different sidelink communications overlapping with the initial transmission of the sidelink communication or the one or more future transmissions of the sidelink communication, and where the sidelink assistance information indicates an interference associated with the overlapping.

Some examples of the method, apparatuses, and non-transitory computer-readable medium described herein may further include operations, features, means, or instructions for multiplexing the inter-UE coordination message including the sidelink assistance information with a sidelink data transmission and where transmitting the inter-UE coordination message including the sidelink assistance information may be based on the multiplexing.

Some examples of the method, apparatuses, and non-transitory computer-readable medium described herein may further include operations, features, means, or instructions for determining that a quantity of interference conditions associated with sidelink communications satisfies a threshold, one or more of the quantity of interference conditions corresponding to a previous interference of a future interference associated with sidelink communications and where transmitting the inter-UE coordination message including the sidelink assistance information may be based on the determined quantity of interference conditions satisfying the threshold.

In some examples of the method, apparatuses, and non-transitory computer-readable medium described herein, the sidelink assistance information indicates overlapping sidelink transmissions, overlapping sidelink resource reservations, a resource allocation for each overlapping sidelink transmission of the overlapping sidelink transmissions, or a combination thereof.

Some examples of the method, apparatuses, and non-transitory computer-readable medium described herein may further include operations, features, means, or instructions for receiving a first sidelink transmission and a second sidelink transmission, the first sidelink transmission corresponding to a first priority and the second sidelink transmission corresponding to a second priority different than the first priority, the first sidelink transmission and the second sidelink transmission correspond to the interference condition associated with an initial transmission of sidelink communication and where generating the sidelink assistance information may be based on the first sidelink transmission and the second sidelink transmission.

In some examples of the method, apparatuses, and non-transitory computer-readable medium described herein, the sidelink assistance information includes information associated with the first sidelink transmission or the second sidelink transmission, or both, based on the first priority or the second priority, or both.

In some examples of the method, apparatuses, and non-transitory computer-readable medium described herein, the sidelink assistance information includes information associated with the first sidelink transmission or the second sidelink transmission, or both, based on a reference signal received power (RSRP) value associated with the first sidelink transmission or the second sidelink transmission, or both.

A method for wireless communication at a UE is described. The method may include receiving inter-UE coordination message including sidelink assistance information, the sidelink assistance information including information associated with an interference condition, receiving a retransmission of the sidelink communication, and decoding the received retransmission of the sidelink communication based on the received inter-UE coordination message including the sidelink assistance information.

An apparatus for wireless communication at a UE is described. The apparatus may include a processor, memory coupled with the processor, and instructions stored in the memory. The instructions may be executable by the processor to cause the apparatus to receive inter-UE coordination message including sidelink assistance information, the sidelink assistance information including information associated with an interference condition, receive a retransmission of the sidelink communication, and decode the received retransmission of the sidelink communication based on the received inter-UE coordination message including the sidelink assistance information.

Another apparatus for wireless communication at a UE is described. The apparatus may include means for receiving inter-UE coordination message including sidelink assistance information, the sidelink assistance information including information associated with an interference condition, means for receiving a retransmission of the sidelink communication, and means for decoding the received retransmission of the sidelink communication based on the received inter-UE coordination message including the sidelink assistance information.

A non-transitory computer-readable medium storing code for wireless communication at a UE is described. The code may include instructions executable by a processor to receive inter-UE coordination message including sidelink assistance information, the sidelink assistance information including information associated with an interference condition, receive a retransmission of the sidelink communication, and decode the received retransmission of the sidelink communication based on the received inter-UE coordination message including the sidelink assistance information.

Some examples of the method, apparatuses, and non-transitory computer-readable medium described herein may further include operations, features, means, or instructions for determining an interference condition associated with an initial transmission of the sidelink communication over a sidelink resource of a sidelink resource pool based on a failure to decode the initial transmission of the sidelink communication, transmitting a request for the sidelink assistance information based on the determined interference condition associated with the initial transmission of the sidelink communication, and where receiving the inter-UE coordination message including the sidelink assistance information may be based on the transmitted request for the sidelink assistance information.

Some examples of the method, apparatuses, and non-transitory computer-readable medium described herein may further include operations, features, means, or instructions for transmitting SCI, a MAC-CE, or a RRC message, or a combination thereof and where the SCI, the MAC-CE, or the RRC message includes the request for the sidelink assistance information.

Some examples of the method, apparatuses, and non-transitory computer-readable medium described herein may further include operations, features, means, or instructions for determining a quantity of failures to decode the sidelink communication and where transmitting the request for the sidelink assistance information based on the determined quantity of failures satisfying a threshold.

Some examples of the method, apparatuses, and non-transitory computer-readable medium described herein may further include operations, features, means, or instructions for decoding a physical sidelink control channel (PSCCH) associated with the initial transmission of the sidelink communication and where the failure to decode the initial transmission of the sidelink communications corresponds to a lack of decoding a transport block indicated by the PSCCH associated with the initial transmission of the sidelink communication.

In some examples of the method, apparatuses, and non-transitory computer-readable medium described herein, determining the interference condition may include operations, features, means, or instructions for detecting a sidelink reference signal associated with a different transmission of a different sidelink communication, the sidelink reference signal including a demodulation reference signal of a PSCCH.

In some examples of the method, apparatuses, and non-transitory computer-readable medium described herein, determining the interference condition may include operations, features, means, or instructions for determining a that RSRP value or a reference signal received quality (RSRQ) value associated with an initial transmission of the sidelink communication satisfies a threshold.

In some examples of the method, apparatuses, and non-transitory computer-readable medium described herein, the assistance information may be preconfigured.

Some examples of the method, apparatuses, and non-transitory computer-readable medium described herein may further include operations, features, means, or instructions for determining that a recipient of the initial transmission of the sidelink communication includes the UE based on SCI of the initial transmission of the sidelink communication, the SCI indicating a destination identifier and where transmitting the request for the sidelink assistance information may be based on the determining that the recipient of the initial transmission of the sidelink communication includes the UE.

Some examples of the method, apparatuses, and non-transitory computer-readable medium described herein may further include operations, features, means, or instructions for transmitting a PSFCH during a PSFCH occasion, the PSFCH carrying the request for the sidelink assistance information.

In some examples of the method, apparatuses, and non-transitory computer-readable medium described herein, the request identifies a time and frequency resource location associated with the failure to decode the initial transmission of the sidelink communication.

In some examples of the method, apparatuses, and non-transitory computer-readable medium described herein, the request identifies a cyclic redundancy check value, a modulation order, a MCS scheme, a resource allocation, a reference signal pattern, an offset value, or any combination thereof, associated with a different transmission of a different sidelink communication that overlaps with the initial transmission of the sidelink communication over a sidelink resource of a sidelink resource pool.

In some examples of the method, apparatuses, and non-transitory computer-readable medium described herein, the interference condition corresponds to one or more different transmissions of different sidelink communications that overlap with the initial transmission of the sidelink transmission over the sidelink resource of the sidelink resource pool.

DETAILED DESCRIPTION

Figure 1:
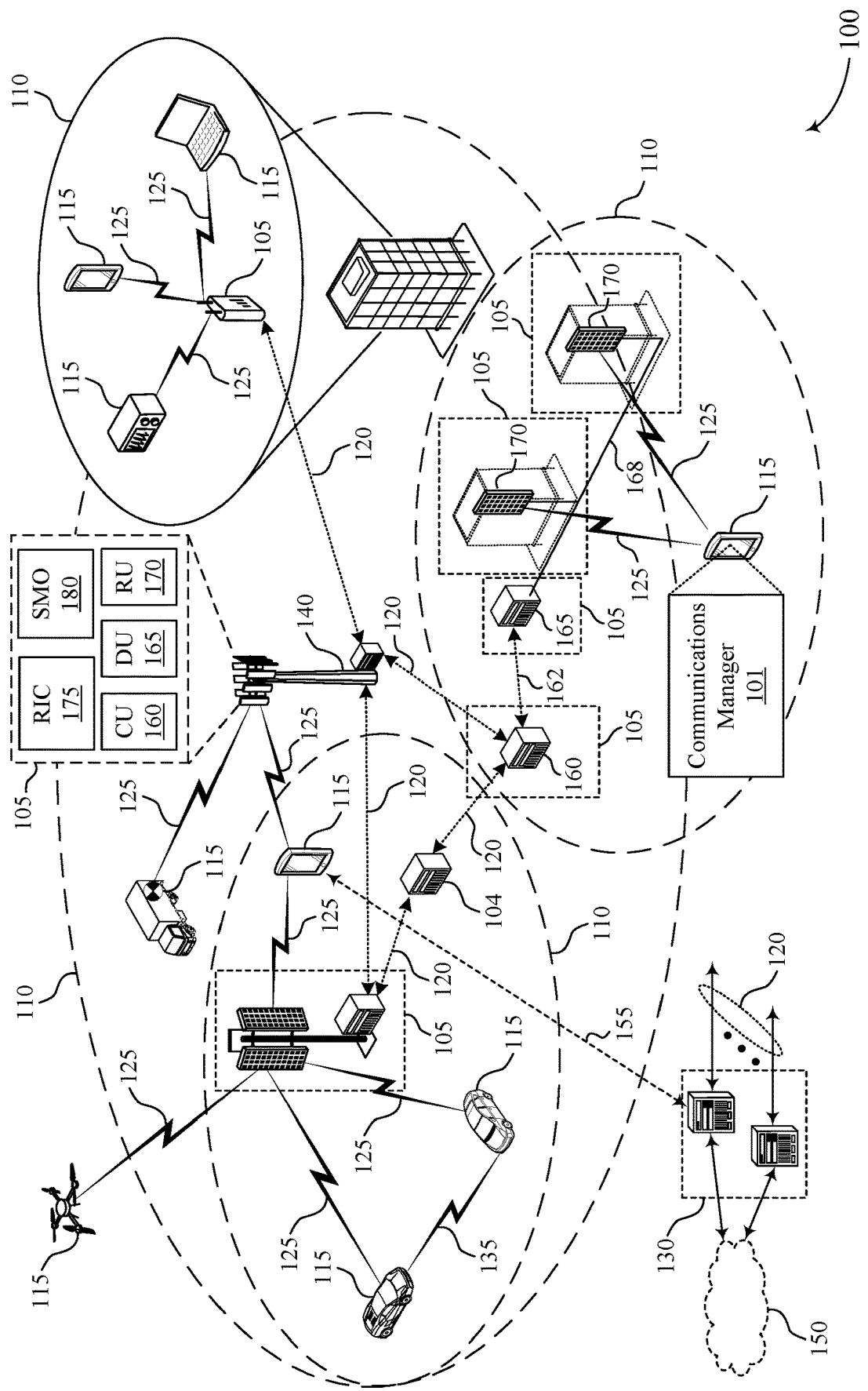
FIGS. 1 and 2 illustrate examples of wireless communications systems that support techniques for interference cancellation in sidelink communication in accordance with one or more aspects of the present disclosure.

A wireless communications system may include a communication device, such as a UE or a network entity (e.g., an eNodeB (eNB), a next-generation NodeB or a giga-NodeB, either of which may be referred to as a gNB, or some other base station), that support wireless communications over one or multiple radio access technologies. Examples of radio access technologies include 4G systems, such as LTE systems, 5G systems, which may be referred to as NR systems, or other systems and radio technologies, including future systems and radio technologies not explicitly mentioned herein (e.g., sixth generation (6G) systems). The wireless communications may include uplink transmission, uplink reception, downlink transmission, or downlink reception, sidelink transmission, sidelink reception, or a combination thereof.

A UE may support sidelink communications with other UEs. In some cases, the UE may support sidelink communications using different operating modes (also referred to as sidelink modes). In a first sidelink mode (referred to as Mode 1), a network entity may schedule sidelink communications (e.g., allocate sidelink resources for the sidelink communications) for the UE. Alternatively, in a second sidelink mode (referred to as Mode 2), the UE may autonomously perform sidelink communications by reserving sidelink resources of a sidelink resource pool. In some cases, to mitigate interference for sidelink communications, a UE may share inter-UE coordination information with other UEs. The UE-coordination information may indicate preferred sidelink resources for the UE, non-preferred sidelink resources for the UE, interference of sidelink transmissions or sidelink resource reservations, and the like. The UE may perform interference cancellation by decoding aspects of an interfering sidelink transmission, determining characteristics of the sidelink transmission (e.g., a modulation and coding scheme (MCS)), and processing the sidelink transmission based on the interference cancellation. In some cases, the interference cancellation may exclusively be performed based on the UE's ability to decode sidelink control information (SCI) of a sidelink transmission causing interference.

Various aspects of the present disclosure relate to enabling a UE to share inter-UE coordination information for interference cancellation for sidelink communications. According to one aspect, a UE may support sharing inter-UE coordination information based on a request for the inter-UE coordination information. For example, a UE may receive a sidelink transmission over a sidelink resource and fail to decode to the sidelink transmission. Based on the failed decoding, the UE may request another UE for sidelink assistance information that may be used by the UE for interference cancellation, such that the UE may successfully decode a sidelink transmission intended for the UE. The other UE may receive the request and transmit, to the UE, inter-UE coordination information, which may include sidelink assistance information associated with the sidelink transmission causing interference. Based on the sidelink assistance information, the UE may decode the failed sidelink transmission. According to another aspect, the UE may support sharing inter-UE coordination information based on a condition. For example, a UE may detect an interference associated with sidelink transmissions. The UE may transmit, to another UE, an inter-UE coordination message carrying sidelink assistance information for interference cancellation. The other UE may receive the inter-UE coordination message and use contents of the sidelink assistance information to decode a failed sidelink transmission or a future sidelink transmission.

As described herein, a UE may support high reliability and low latency sidelink communications by supporting inter-UE coordination messaging. For example, the UE may support an exchange of sidelink assistance information with other UEs to enable high reliability and low latency sidelink communications while providing power saving at the UE.

Aspects of the disclosure are initially described in the context of wireless communications systems. Aspects of the disclosure are further illustrated by and described with reference to apparatus diagrams, system diagrams, and flowcharts that relate to techniques for interference cancellation in sidelink communication.

FIG. 1 illustrates an example of a wireless communications system 100 that supports techniques for interference cancellation in sidelink communication in accordance with one or more aspects of the present disclosure. The wireless communications system 100 may include one or more network entities 105, one or more UEs 115, and a core network 130. In some examples, the wireless communications system 100 may be an LTE network, an LTE-Advanced (LTE-A) network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for interference cancellation in sidelink communication as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The wireless communications system 100 may support sidelink communications, which may enable a UE 115 to directly communicate with another UE 115 via a sidelink communication channel (also referred to as sidelink). In the wireless communications system 100, a UE 115 may support sidelink communications over one or more modes. In a first mode (e.g., a first sidelink mode), the UE 115 may support sidelink communications (e.g., sidelink transmission, sidelink reception) using sidelink resources scheduled by a network entity 105 or a base station 140. Alternatively, in a second mode (e.g., a second sidelink mode), the UE 115 may support sidelink communications (e.g., sidelink transmission, sidelink reception) autonomously using sidelink resources from a sidelink resource pool. The sidelink resource pool may be a preconfigured sidelink resource pool.

According to the second mode (e.g., the second sidelink mode), the UE 115 may support sidelink communications in accordance with reservation-based scheduled sidelink resources. For example, a UE 115 (e.g., a transmitter UE) may select and reserve a quantity of resources in a quantity of future occasions (e.g., sub-slots, slots, subframes, frames) for retransmission of a same transport block (TB). In some cases, the UE 115 may reserve one or two future occasions for the retransmission of the same TB. The UE 115 may indicate the reserved quantity of resources for transmission of the same TB. In some cases, the UE 115 may indicate a repetition of the reservation of transmission of another TB. The indication may identify a duration value of the reservation (e.g., periodical reservation). In some cases, the UE 115 may provide the indication in SCI. For example, the UE 115 may transmit a first stage SCI via a physical sidelink control channel (PSCCH).

A UE 115 may perform resource selection based on monitoring one or more sidelink channels in the wireless communications system 100. For example, a UE 115 may select sidelink resources for sidelink communications (e.g., sidelink transmissions, sidelink reception) at the UE 115 based on monitoring one or more sidelink channels for one or more sidelink transmissions from other UEs 115 in the wireless communications system 100. As such, the UE 115 may select sidelink resources that are unreserved by other UEs 115 in the wireless communications system 100. In some cases, a UE 115 may perform resource selection based on signal strength measurements. For example, a UE 115 may perform reference signal received power (RSRP) measurements based on monitoring one or more sidelink channels for one or more sidelink communications (e.g., sidelink signals) from other UEs 115 in the wireless communications system 100. Sidelink resources reserved by other UEs 115 may be classified as available by the UE 115 based on RSRP measured values of sidelink communications (e.g., sidelink signals) transmitted by the other UEs 115 satisfies an RSRP threshold value (e.g., below an RSRP threshold value).

In some cases, when operating in accordance with the second mode (e.g., the second sidelink mode), the UE 115 may reserve sidelink resources based on sensing sidelink information from other UEs 115 in the wireless communications system 100. For example, a UE 115, such as a transmitter UE may decode sidelink information (e.g., SCI) from other UEs 115 in the wireless communications system 100. The sidelink information, such as SCI may indicate reserved resources associated with future occasions (e.g., future slots). Based on the decoded sidelink information (e.g., SCI), the UE 115 may determine candidate sidelink resources associated with a sidelink resource selection window. In some cases, the UE 115 may determine, based on the decoded sidelink information and RSRP measurements, a set of candidates sidelink resources associated with the sidelink resource selection window, which may exclude reserved sidelink resources associated with RSRP measurement values satisfying an RSRP threshold value. For example, the sidelink resource selection window may exclude reserved sidelink resources associated with RSRP measurement values greater than an RSRP threshold value. The UE 115 may randomly select sidelink resources from the set of candidates sidelink resources associated with the sidelink resource selection window and perform sidelink communications using the selected sidelink resources.

By way of example, a UE 115 may decode sidelink transmissions during a sidelink sensing window. The UE 115 may analyze the decoded sidelink transmissions based on determining a triggering for sidelink resource selection. Based on the decoded sidelink transmissions, the UE 115 may determine candidate sidelink resources in a future resource selection window with reserved sidelink resources excluded and the remaining sidelink resources being the candidate sidelink resources for the future resource selection window. The UE 115 may select a set of sidelink resources associated with the future resource selection window and perform sidelink communications using the selected sidelink resources.

In the wireless communications system 100, a UE 115 may support inter-UE coordination with other UEs 115. In some cases, the UE 115 may support inter-UE coordination with other UEs 115 for sidelink communications associated with operation in accordance with a second sidelink mode (e.g., Mode 2). Inter-UE coordination may improve autonomous selection of sidelink resources by UEs 115 in presence of hidden UEs 115 (also referred to hidden nodes) in the wireless communications system 100. In some cases, two UEs 115 that are hidden (e.g., undiscoverable) from each other may reserve the same sidelink resources. In some other cases, two UEs 115 that are hidden (e.g., undiscoverable) from each other may perform sidelink communications on the same reserved sidelink resources.

By way of example, a UE 115 may generate and share inter-UE coordination information with another UE 115 in the wireless communications system 100. In some cases, the UE 115 may transmit inter-UE coordination information indicating preferred sidelink resources for sidelink communications at the other UE 115. Put another way, the UE 115 may send inter-UE coordination information indicating preferred sidelink resources for the other UE's 115 sidelink transmission. In some other cases, the UE 115 may transmit inter-UE coordination information indicating non-preferred sidelink resources for sidelink communications at the other UE 115. Put another way, the UE 115 may send inter-UE coordination information indicating non-preferred sidelink resources for the other UE's 115 sidelink transmission. In other cases, the UE 115 may transmit inter-UE coordination information indicating a conflict of sidelink communications or sidelink resource reservations. The other UE 115 may perform retransmission of sidelink communications or reselect sidelink resources based on the received inter-UE coordination information.

In some cases, inter-UE coordination information may include conflict indication, which notifies a conflict associated with a UE 115 sidelink resource allocation. In some other cases, inter-UE coordination information may indicate preferred sidelink resources and non-preferred sidelink resources for a UE 115 sidelink transmissions.

In LTE V2X systems, a UE 115 may be configured to perform interference cancellation for sidelink communications. That is, the UE 115 may be configured with a receiver that may support interference cancellation for sidelink reception (e.g., received sidelink signals). For example, the UE 115 may decode a first sidelink transmission, perform interference cancellation, and decode a second sidelink transmission on the same sidelink resource. As a result, a UE 115 configured to perform interference cancellation may decode overlapping sidelink transmissions (e.g., at least two sidelink transmissions communicated on overlapping sidelink resources). In some cases, overlapping sidelink transmissions may be common for sidelink autonomous resource allocation.

Examples of interference may be symbol level interference and codeword level interference. For symbol level interference operation, a UE 115 may perform channel estimation, perform demodulation, perform hard decision, reconstruct a received interfering sidelink transmission, perform interference cancellation, and detect an intended sidelink transmission based on the performed interference cancellation. For codeword level interference operation, a UE 115 may perform additional decoding after performing demodulation. The additional decoding after performing demodulation may be more robust than symbol level interference operation.

In some cases, a UE 115 configured to perform interference cancellation for sidelink communications may experience improved throughput by decoding sidelink transmission in overlapping time and frequency sidelink resources. In some other cases, a UE 115 configured to perform interference cancellation for sidelink communications may experience higher packet reception rate because the UE 115 may be able to decode sidelink transmissions that are interfered with by another sidelink transmission. In other cases, the wireless communications system 100 may experience higher system capacity as a result of UEs 115 configured to perform interference cancellation for sidelink communications.

In some cases, to perform interference cancellation for sidelink communications, a UE 115 (e.g., a receiver UE) may have to know information (e.g., parameters, configurations, etc.) associated with an interfering sidelink transmission. In some cases, the UE 115 may be able to decode control information associated with the interfering sidelink transmission. For example, the UE 115 may decode SCI in a PSCCH associated with the interfering sidelink transmission. The UE 115 may then perform interference cancellation based on the information (e.g., parameters, configurations, etc.) indicated in the decoded SCI.

In the wireless communications system 100, a UE 115 may be configured to decode overlapping sidelink transmissions transmitted by different UEs 115. For example, a UE 115 may decode overlapping PSCCH transmissions transmitted by different UEs 115 because demodulation reference signals (DMRSs) associated with the different PSCCH transmissions may be orthogonal. In some cases, various orthogonal cover codes or cyclic shifts may be configured for PSSCH DMRS. A UE 115 may randomly select an orthogonal cover code or cyclic shift for a PSCCH transmission. In some other cases, a UE 115 may be unable to decode overlapping sidelink transmissions transmitted by different UEs 115 because the sidelink transmissions may have a low received power (e.g., a low RSRP value) or a cyclic shift of the overlapping sidelink transmissions may be the same.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In the wireless communications system 100, a UE 115 may be configured to support interference cancellation for sidelink communications. In some cases, the UE 115 may perform the interference cancellation exclusively when at least a sidelink control channel (e.g., a PSCCH) associated with an interfering sidelink transmission can be decoded by the UE 115. In some other cases, the UE 115 may perform the interference cancellation (e.g., symbol level interference cancellation, code word level interference cancellation) based on decoding one or both of a sidelink control channel (e.g., a PSCCH) and a sidelink data channel (e.g., PSSCH) associated with the interfering sidelink transmission. In other cases, the UE 115 may perform the interference cancellation (e.g., symbol level interference cancellation) based on exclusively decoding the sidelink data channel (e.g., PSSCH) associated with the interfering sidelink transmission. In some other cases, the UE 115 may be unable to perform interference cancellation based on being unable to decode (e.g., a decoding failure of) the sidelink data channel (e.g., PSSCH) associated with the interfering sidelink transmission. As a result, the UE 115 may experience unsatisfactory performance because interference cancellation may be compromised.

Various aspects of the present disclosure relate to inter-UE coordination between UEs 115 in the wireless communications system 100, including supporting interference cancellation for sidelink communications in the wireless communications system 100 as described herein. A UE 115 may include a communications manager 101 that may support inter-UE coordination assisted interference cancellation for sidelink communications in the wireless communications system 100 in accordance with examples as disclosed herein. The communications manager 101 may be an example of aspects of a communications manager described with reference to FIGS. 5 through 8. The wireless communications system 100 may promote high reliability and low latency wireless communication for the UEs 115. The wireless communications system 100 may also promote better coordination between the UEs 115.

Figure 2:
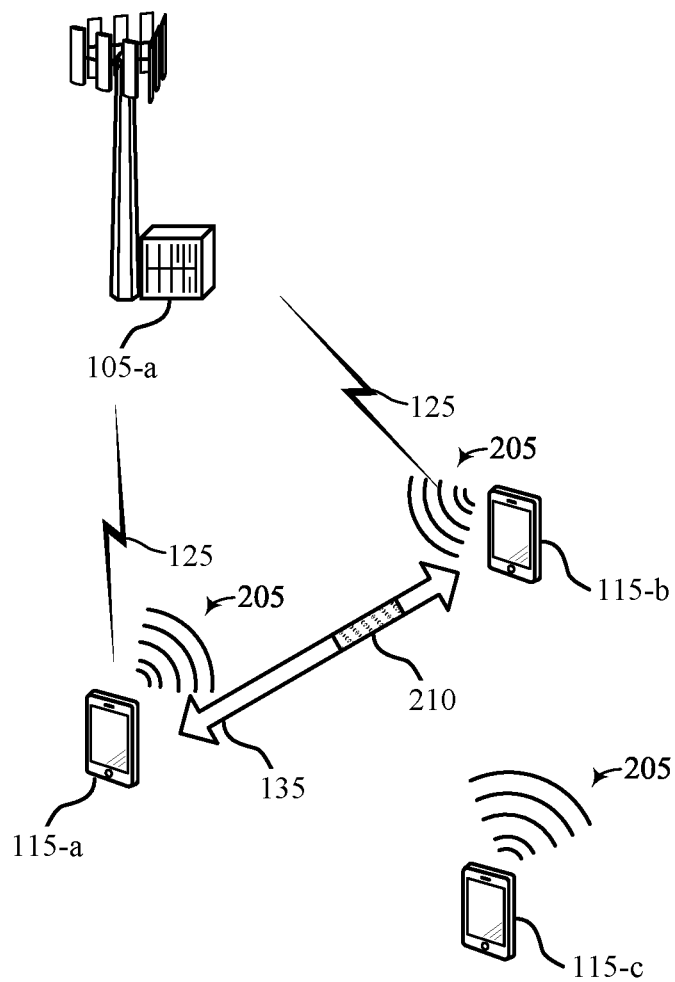

FIG. 2 illustrates an example of a wireless communications system 200 that supports techniques for interference cancellation in sidelink communication in accordance with one or more aspects of the present disclosure. The wireless communications system 200 may implement or be implemented by aspects of the wireless communications system 100. For example, the wireless communications system 200 may include a network entity 105-*a* and UEs 115 (including a UE 115-*a*, a UE 115-*b*, and a UE 115-*c*), which may be examples of a network entity 105 and UEs 115 as described with reference to FIG. 1. The wireless communications system 200 may support multiple radio access technologies including 4G systems such as LTE systems, LTE-A systems, or LTE-A Pro systems, 5G systems, or other systems and radio technologies, including future systems and radio technologies not explicitly mentioned herein (e.g., 6G systems). The wireless communications system 200 may mitigate and promote interference cancellation for sidelink communications between the UEs 115.

One or more of the UE 115-*a*, the UE 115-*b*, or the UE 115-*c*, or a combination thereof may perform sidelink communications in accordance with one or more sidelink modes. For a first sidelink mode, the network entity 105-*a* may schedule sidelink communications (e.g., allocate sidelink resources for sidelink communications) for one or more of the UE 115-*a*, the UE 115-*b*, or the UE 115-*c*, or a combination thereof. For example, the network entity 105-*a* may transmit a sidelink grant over communication links 125 to one or both of the UE 115-*a* or the UE 115-*b* scheduling sidelink resources for one or both of the UE 115-*a* or the UE 115-*b*. Alternatively, for a second sidelink mode, one or more of the UE 115-*a*, the UE 115-*b*, or the UE 115-*c*, or a combination thereof may autonomously perform sidelink communications by reserving sidelink resources of a sidelink resource pool, which may be shared with between the UE 115-*a*, the UE 115-*b*, and the UE 115-*c*.

In the example of FIG. 2, one or more of the UE 115-*a*, the UE 115-*b*, or the UE 115-*c*, or a combination thereof may support interference cancellation for sidelink communications. For example, one or more of the UE 115-*a*, the UE 115-*b*, or the UE 115-*c*, or a combination thereof may support interference cancellation by supporting inter-UE coordination messaging including sidelink assistance information for performing the interference cancellation for sidelink communications. One or more of the UE 115-*a*, the UE 115-*b*, or the UE 115-*c*, or a combination thereof may support request-based transmission of inter-UE coordination messaging. Additionally, or alternatively, one or more of the UE 115-*a*, the UE 115-*b*, or the UE 115-*c*, or a combination thereof may support condition-based transmission of inter-UE coordination messaging.

The UE 115-*b* may determine an interference condition associated with a sidelink transmission 205 over a sidelink resource of a sidelink resource pool based on a failure to decode the sidelink transmission 205. Put another way, the UE 115-*b* may fail decoding a sidelink transmission 205 associated with a sidelink resource and determine that there is interference for the sidelink resource. In some examples, the interference condition may be based on a sidelink transmission 205 from the UE 115-*a* or the UE 115-*c*. Additionally, in some examples, the UE 115-*a* may receive the sidelink transmission 205 associated with the UE 115-*c* that may be interfering with other sidelink transmissions 205 at the UE 115-*a* or the UE 115-*b*.

The UE 115-*b* may transmit, to the UE 115-*a*, a request for sidelink assistance information based on the determined interference condition associated with the sidelink transmission 205 from the UE 115-*c*. The request for sidelink assistance information may indicate information to be included as part of the sidelink assistance information. In some examples, the sidelink assistance information may be preconfigured or predetermined. The UE 115-*a* may receive, from the UE 115-*b*, the request for sidelink assistance information and may generate the sidelink assistance information. The UE 115-*a* may transmit, to the UE 115-*b*, an inter-UE coordination message 210 including the generated sidelink assistance information over a communication link 135 (e.g., a sidelink channel). The UE 115-*b* may receive a retransmission of a sidelink transmission 205 (e.g., a retransmission of a failed sidelink transmission 205) and decode the received sidelink retransmission 205 based on the sidelink assistance information received in the inter-UE coordination message 210.

Sidelink assistance information may include information for interference cancellation. In some examples, the sidelink assistance information may include CRC values of a PSCCH associated with a sidelink transmission 205 causing interference in the wireless communications system 200. For example, a CRC value of an interfering PSCCH needed for DMRS and scrambling sequence generation for interfering PSSCH. In some other examples, the sidelink assistance information may include a modulation order or an MCS associated with a sidelink transmission 205 causing interference in the wireless communications system 200. For example, a modulation order or an MCS of an interfering PSSCH. In other examples, the sidelink assistance information may include a resource allocation associated with a sidelink transmission 205 causing interference in the wireless communications system 200. For example, sidelink assistance information may include resource allocation associated with an interfering PSSCH (e.g., a frequency location and number of subchannels). In some other examples, the sidelink assistance information may include an offset value. For example, a beta offset value to determine number of resource elements used by an interfering SCI-2. The sidelink assistance information may also include a reference signal pattern (e.g., a DMRS pattern of an interfering PSSCH).

In some examples, the UE 115-*b* may transmit, and the UE 115-*a* may receive, the request (e.g., a container of the request) for sidelink assistance information in SCI. In some other examples, the UE 115-*b* may transmit, and the UE 115-*a* may receive, the request (e.g., a container of the request) for sidelink assistance information in a medium access control-control element (MAC-CE). In other examples, the UE 115-*b* may transmit, and the UE 115-*a* may receive, the request (e.g., a container of the request) for sidelink assistance information in an RRC message. Additionally, or alternatively, the UE 115-*b* may transmit, and the UE 15-*a* may receive, a PSFCH during a PSFCH occasion. The PSFCH may carry the request for the sidelink assistance information. Put another way, the request for sidelink assistance information may be transmitted in a PSFCH occasion, as a PSFCH-like signal. In some examples, sidelink resources used for the request for sidelink assistance information may be configured in the PSFCH occasion.

In some cases, the UE 115-*a* may decode a sidelink transmission 205 interfering with sidelink transmissions 205 at the UE 115-*b*. Put another way, the UE 115-*a* may have decoded an interference signal in a conflicted sidelink resource and received the request for sidelink assistance information from the UE 115-*b*. Alternatively, the UE 115-*b* may be the cause for the sidelink transmission 205 interfering with sidelink transmissions 205 at the UE 115-*b*. Additionally, the UE 115-*a* may be the UE that transmitted the sidelink transmission 205 that interfered with the UE 115-*b* reception of other sidelink transmissions 205.

The UE 115-*b* may determine that a recipient of a sidelink transmission 205 includes the UE 115-*b* based on SCI of the sidelink transmission 205. For example, the UE 115-*b* may determine that the recipient of the sidelink transmission 205 includes the UE 115-*b* based on decoding SCI of the sidelink transmission 205. The SCI may indicate a destination identifier. For example, the destination identifier may be carried in a SCI-2 of the sidelink transmission 205 and may be decodable by the UE 115-*b*. The UE 115-*b* may transmit, to the UE 115-*a*, a request for sidelink assistance information based on determining the recipient of the sidelink transmission 205. Put another away, the UE 115-*b* may transmit the request for sidelink assistance information when the UE 115-*b* determines that the UE 115-*b* is the intended recipient of the sidelink transmission 205.

In some examples, the UE 115-*a* may detect an interference based on detecting a previous interference condition between sidelink transmissions 205 or determining a future interference condition between sidelink transmissions 205. The UE 115-*a* may transmit, to the UE 115-*b*, the inter-UE coordination message 210 including the sidelink assistance information based on the detected previous interference condition between sidelink transmissions 205 or the determined future interference condition between sidelink transmissions 205. The UE 115-*b* may receive, from the UE 115-*a*, the inter-UE coordination message 210 and may decode a failed sidelink transmission 205 again (e.g., for previously occurred sidelink transmissions 205) or may perform interference cancellation for decoding sidelink transmissions 205 associated with the future interference condition.

The UE 115-*b* may decode a sidelink data channel (e.g., a PSSCH) associated with a sidelink transmission 205. In some examples, the UE 115-*b* may determine a failure to decode the sidelink transmission 205 based on a lack of decoding a TB indicated by the sidelink data channel (e.g., the PSCCH) associated with the sidelink transmission 205. Put another way, the UE 115-*b* may be able to decode a PSCCH associated with a sidelink resource but might be unable to decode a TB associated with the PSCCH. In some cases, decoding the PSCCH may be an indication that there is a sidelink transmission 205 or a TB associated with the PSCCH associated with the sidelink resource.

The UE 115-*b* may indicate a time and a frequency resource location associated with a decoding failure of a sidelink transmission 205 in the request for sidelink assistance information. In some examples, there may be a mapping between sidelink resources associated with the failed decoding of a sidelink transmission 205 and sidelink resources associated with the request for sidelink assistance information.

In some examples, the UE 115-*b* may determine an interference condition based on detecting a sidelink reference signal associated with a sidelink transmission 205. The sidelink reference signal may be a DMRS of a PSCCH. In some other examples, the UE 115-*b* may determine an interference condition based on detecting a cyclic shift of a sidelink reference signal associated with a sidelink transmission 205. Put another way, the UE 115-*b* may detect another cyclic shift of a PSCCH DMRS. The UE 115-*b* may determine an interference condition based on determining that a reference signal received power (RSRP) value or a reference signal received quality (RSRQ) value associated with a sidelink transmission 205 (e.g., an interfering sidelink transmission) satisfies a threshold (e.g., an RSRP threshold value, an RSRQ threshold value). Additionally, or alternatively, the UE 115-*b* may determine an interference condition based on determining that a signal to interreference noise ratio (SINR) associated with a sidelink transmission 205 (e.g., an interfering sidelink transmission) satisfies a threshold (e.g., an SINR threshold value).

The UE 115-*b* may transmit, and the UE 115-*a* may receive, a request for sidelink assistance information based on a quantity of decoding failures of sidelink transmissions 205. That is, the UE 115-*b* may transmit the request for sidelink assistance information based on at least a number of failed decoding attempts of the sidelink transmissions 205. For example, the UE 115-*b* may transmit the request for sidelink assistance information based on the number of failed decoding attempts satisfying a threshold (e.g., two failed decoding attempts). The threshold may be preconfigured or predetermined. By enabling the UE 115-*b* to transmit the request for sidelink assistance information based on a number of failed decoding attempts may reduce the number of requests for sidelink assistance information being transmitted in the wireless communications system 200.

The UE 115-*a* may decode at least two sidelink transmissions 205 associated with overlapping sidelink resources. For example, the UE 115-*a* may determine an interference condition based on SCI associated each of the at least two decoded sidelink transmissions 205. While the UE 115-*a* may be able to decode the at least two decoded sidelink transmission 205, the UE 115-*b* may be unable to decode these sidelink transmissions (e.g., failed decoding). The UE 115-*a* may transmit, and the UE 115-*b* may receive, the inter-UE coordination message 210 including sidelink assistance information, so that the UE 115-*b* may perform interference cancellation and successfully receive and decode a sidelink transmission 205 intended for the UE 115-*b*.

In some examples, the UE 115-*a* may decode a threshold quantity of sidelink transmissions 205 associated with overlapping sidelink resources. For example, the UE 115-*a* may decode a threshold quantity of SCI (e.g., more than one SCI) of sidelink transmissions 205 associated with overlapping sidelink resources. The UE 115-*a* may determine to transmit inter-UE coordination message 210 carrying sidelink assistance information based on decoding the threshold quantity of SCI (e.g., more than one SCI) of sidelink transmissions 205 associated with overlapping sidelink resources. The inter-UE coordination message 210 carrying sidelink assistance information may indicate to the UE 115-*b* that there will be more than one sidelink transmission 205 (e.g., colliding) for a future sidelink resource. As a result, the UE 115-*b* may perform interference cancellation. In some examples, the UE 115-*b* may decode one PSCCH in each sidelink resource. If the UE 115-*b* knows that there are more than one sidelink transmission 205 in the same sidelink resource, the UE 115-*b* may attempt to decode all possible sidelink transmissions 205 (e.g., all cyclic shift values), and apply interference cancellation.

The UE 115-*a* may multiplex the inter-UE coordination message 210 including the sidelink assistance information with a sidelink data transmission. For example, the UE 115-*a* may determine to transmit the sidelink assistance information if the UE 115-*a* has pending data packet transmissions, so that the UE 115-*a* can multiplex the sidelink assistance information with the data packet transmission. In some cases, the UE 115-*a* may multiplex the inter-UE coordination message 210 including the sidelink assistance information based on the data packet transmission corresponding to a broadcast mode. That is, the UE 115-*a* broadcasting the data packet transmission in the wireless communications system 200. Additionally, or alternatively, the UE 115-*a* may multiplex the inter-UE coordination message 210 including the sidelink assistance information if the UE 115-*a* based on a threshold quantity of interference conditions (e.g., a number of conflicts). Put another way, the UE 115-*a* may determine to transmit sidelink assistance information if the UE 115-*a* has at least x conflicts to be included in the sidelink assistance information, where x is a positive integer.

The sidelink assistance information may include information of one or more colliding sidelink transmissions 205. For example, the UE 115-*c* and another UE 115 (not shown) may transmit sidelink transmissions 205 using the same sidelink resources, which (e.g., at least SCIs) have been decoded by the UE 115-*a*. The UE 115-*a* may transmit sidelink assistance information including information only associated with at least one of the one of the colliding sidelink transmissions 205. To determine information associated with the sidelink transmission 205 that will be included in the sidelink assistance information, the UE 115-*a* may select the sidelink transmission 205 that has lower priority (e.g., sidelink transmission 205 with lower priority is treated as interference), or the sidelink transmission 205 that has a smaller measured RSRP by the UE 115-*a*. Alternatively, the UE 115-*a* may transmit information associated with both of the colliding sidelink transmissions 205. This might have higher overhead, but more likely that the UE 115-*b* may obtain the desired information for interference cancellation.

Figure 3:
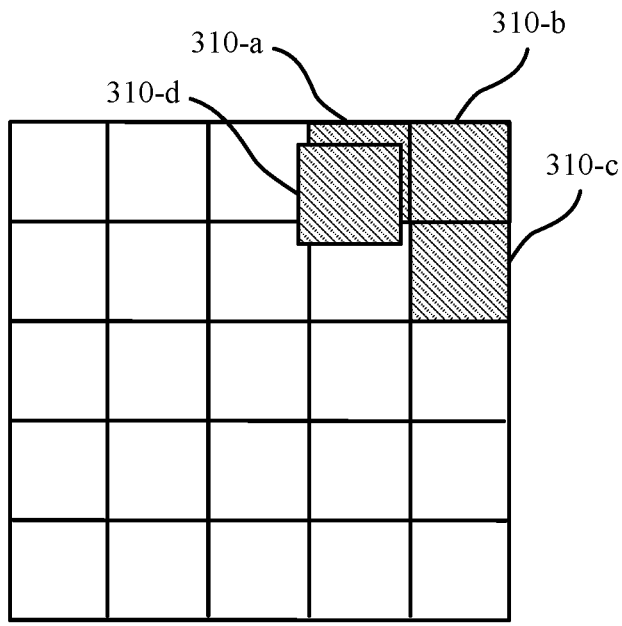
FIG. 3 illustrates an example of a resource grid that supports techniques for interference cancellation in sidelink communication in accordance with one or more aspects of the present disclosure.
Figure 3:
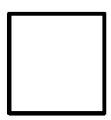
Figure 3:
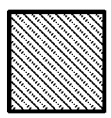

FIG. 3 illustrates an example of a resource grid 300 that supports techniques for interference cancellation in sidelink communication in accordance with one or more aspects of the present disclosure. The resource grid 300 may implement or be implemented by aspects of the wireless communications system 100 and the wireless communications system 200 as described with reference to FIGS. 1 and 2. The resource grid 300 may include time and frequency resources, which may include one or more of symbol durations, slot durations, subcarriers, or carriers. The resource grid 300 may be an example of a sidelink resource pool shared between a group of UEs 115, for example, as described with reference to FIGS. 1 and 2. In the example of FIG. 3, the resource grid 300 may include a set of unreserved sidelink resources 305 and a set of reserved sidelink resources 310.

With reference to FIGS. 2 and 3, the UE 115-*a* may perform sidelink communications using reserved sidelink resource 310-*a*, the UE 115-*b* may perform sidelink communications using reserved sidelink resource 310-*b*, and the UE 115-*c* may perform sidelink communications using reserved sidelink resource 310-*c*. Each of the reserved sidelink resources of the set of reserved sidelink resources 310 may be reserved by one or more of the UE 115-*a*, the UE 115-*b*, or the UE 115-*c* before performing the sidelink communications. For example, the UE 115-*a* may select the reserved sidelink resource 310-*a* based on a resource selection operation (e.g., monitoring a sidelink channel, sensing sidelink transmissions, etc.) as described herein. Likewise, the UE 115-*b* may select the reserved sidelink resource 310-*b* and the UE 115-*c* may select the reserved sidelink resource 310-*c* based on a resource selection operation (e.g., monitoring a sidelink channel, sensing sidelink transmissions, etc.).

In some examples, two or more reserved sidelink resources may overlap in a time domain or a frequency domain, or both. For example, the reserved sidelink resource 310-*a* may overlap in a time domain or a frequency domain, or both, with a reserved sidelink resource 310-*d*. As a result, the UE 115-*a* may perform interference cancellation as described herein. For example, the UE 115-*a* may receive an inter-UE coordination message including sidelink assistance information based on an interference condition (e.g., the reserved sidelink resource 310-*a* overlapping in the time domain or the frequency domain, or both, with the reserved sidelink resource 310-*d*). The sidelink assistance information may include information associated with the interference condition. In some other examples, the reserved sidelink resource 310-*b* may overlap in a time domain with the reserved sidelink resource 310-*c*. As a result, the UE 115-*b* or the UE 115-*c*, or both, may perform interference cancellation as described herein, for example, based on sidelink assistance information received in an inter-UE coordination message.

Figure 4:
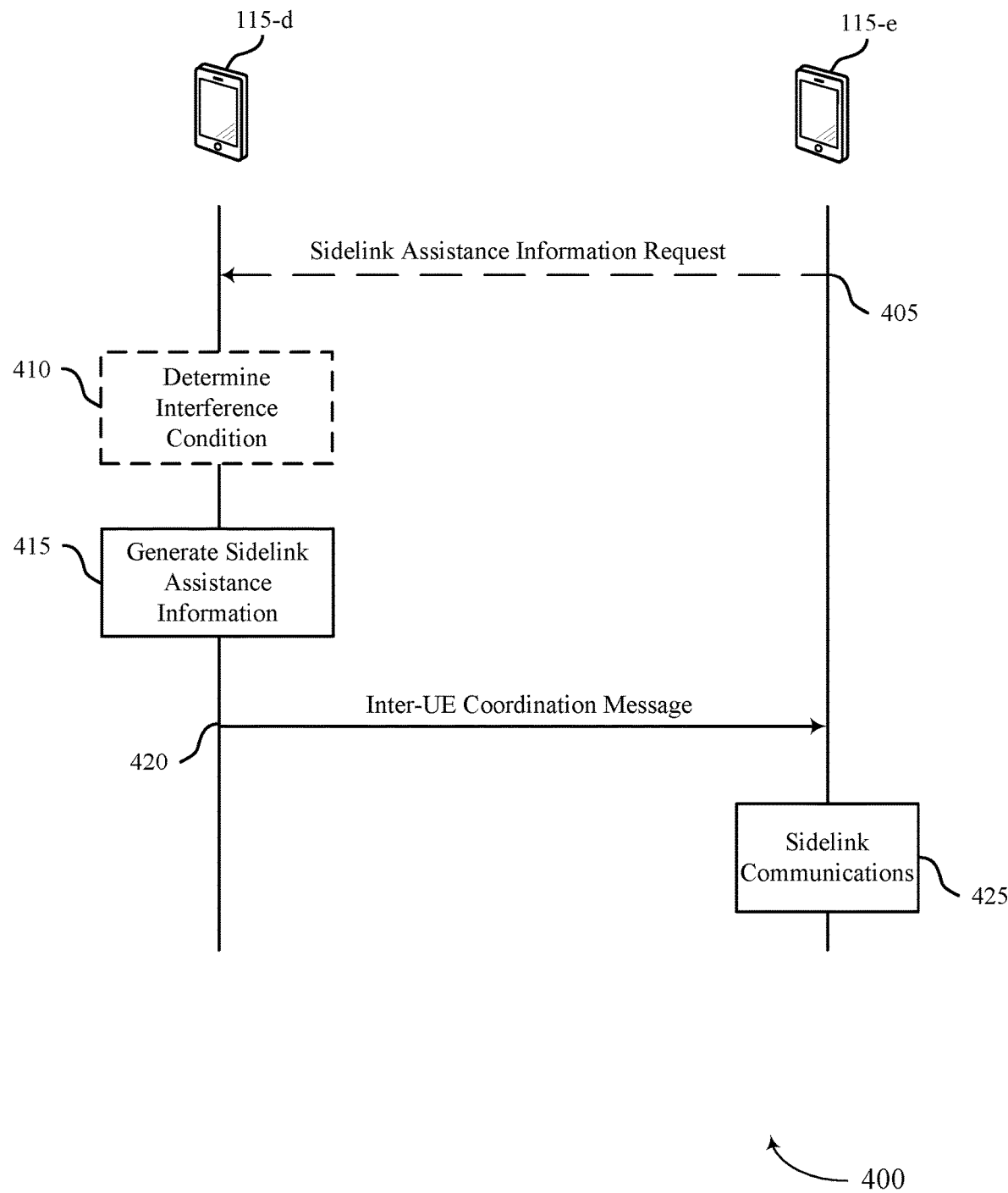
FIG. 4 illustrates an example of a process flow that supports techniques for interference cancellation in sidelink communication in accordance with one or more aspects of the present disclosure.

FIG. 4 illustrates an example of a process flow 400 that supports techniques for interference cancellation in sidelink communication in accordance with one or more aspects of the present disclosure. In some examples, the process flow 400 may implement or be implemented by aspects of the wireless communications system 100 and the wireless communications system 200 as described with reference to FIGS. 1 and 2. For example, the process flow 400 may be implemented by a UE 115-*d* and a UE 115-*e*, which may be examples of a UE 115 as described with reference to FIGS. 1 and 2. In the following description of the process flow 400, the operations between the UE 115-*d* the UE 115-*e* may be transmitted in a different order than the example order shown, or the operations performed by the UE 115-*d* the UE 115-*e* may be performed in different orders or at different times. Some operations may also be omitted from the process flow 400, and other operations may be added to the process flow 400.

In the example of FIG. 4, the process flow 400 may promote better coordination between the UE 115-*d* the UE 115-*e* by enabling the UE 115-*d* and the UE 115-*e* to support request-based transmission of inter-UE coordination messaging including sidelink assistance information to perform interference cancellation for sidelink communications. Additionally, or alternatively, the process flow 400 may promote better coordination between the UE 115-*d* the UE 115-*e* by enabling the UE 115-*d* and the UE 115-*e* to support condition-based transmission of inter-UE coordination messaging including sidelink assistance information to perform interference cancellation for sidelink communications.

At 405, the UE 115-*e* may transmit a request for sidelink assistance information. For example, the UE 115-*e* may transmit the request for sidelink assistance information over a sidelink control channel (e.g., a PSSCH), a sidelink data channel (e.g., a PSSCH), a sidelink feedback channel (e.g., PSFCH), or a combination thereof. In some examples, the UE 115-*e* may transmit SCI, a MAC-CE, or an RRC message, or a combination thereof, including the request for sidelink assistance information. The UE 115-*d* may receive the request for sidelink assistance information from the UE 115-*e*.

In some examples, the UE 115-*e* may determine an interference condition associated with an initial transmission of a sidelink communication over a sidelink resource of a sidelink resource pool based on a failure to decode the initial transmission of the sidelink communication. Put another way, the UE 115-*e* may fail decoding a sidelink transmission and determine that there is interference on a resource associated with the sidelink transmission. As such, the UE 115-*e* may request for sidelink assistance information that the UE 115-*e* may use for interference cancellation.

At 410, the UE 115-*d* may optionally determine an interference condition. The UE 115-*d* may detect conflict related to an initial transmission or a future transmission of sidelink communication. For example, the UE 115-*d* may determine a quantity of different transmissions of different sidelink communication overlapping with the initial transmission of the sidelink communication or one or more future transmissions of the sidelink communication over one or more sidelink resources of a sidelink resource pool.

At 415, the UE 115-*d* may generate sidelink assistance information, for example, based on an interference condition associated with an initial transmission of sidelink communication over a sidelink resource of a sidelink resource pool. The sidelink assistance information may include information associated with the interference condition. At 420, the UE 115-*d* may transmit an inter-UE coordination message including the generated sidelink assistance information, for example, to the UE 115-*e*. The sidelink assistance information may indicate information based on post interference condition (e.g., post conflict). Alternatively, the sidelink assistance information may indicate information based on future interference condition (e.g., pre conflict). Here, the UE 115-*d* may indicate that there will be an overlap in sidelink resource reservation, a sidelink resource location associated with the overlap, or indicate a sidelink resource allocation for each of the colliding sidelink resource reservations, or a combination thereof.

At 425, the UE 115-*e* may perform sidelink communications based on the sidelink assistance information. For example, the UE 115-*e* may perform interference cancellation based on the sidelink assistance information. The UE 115-*e* may receive a retransmission of the sidelink communication and decode the received retransmission of the sidelink communication based on the received inter-UE coordination message including the sidelink assistance information.

Figure 5:
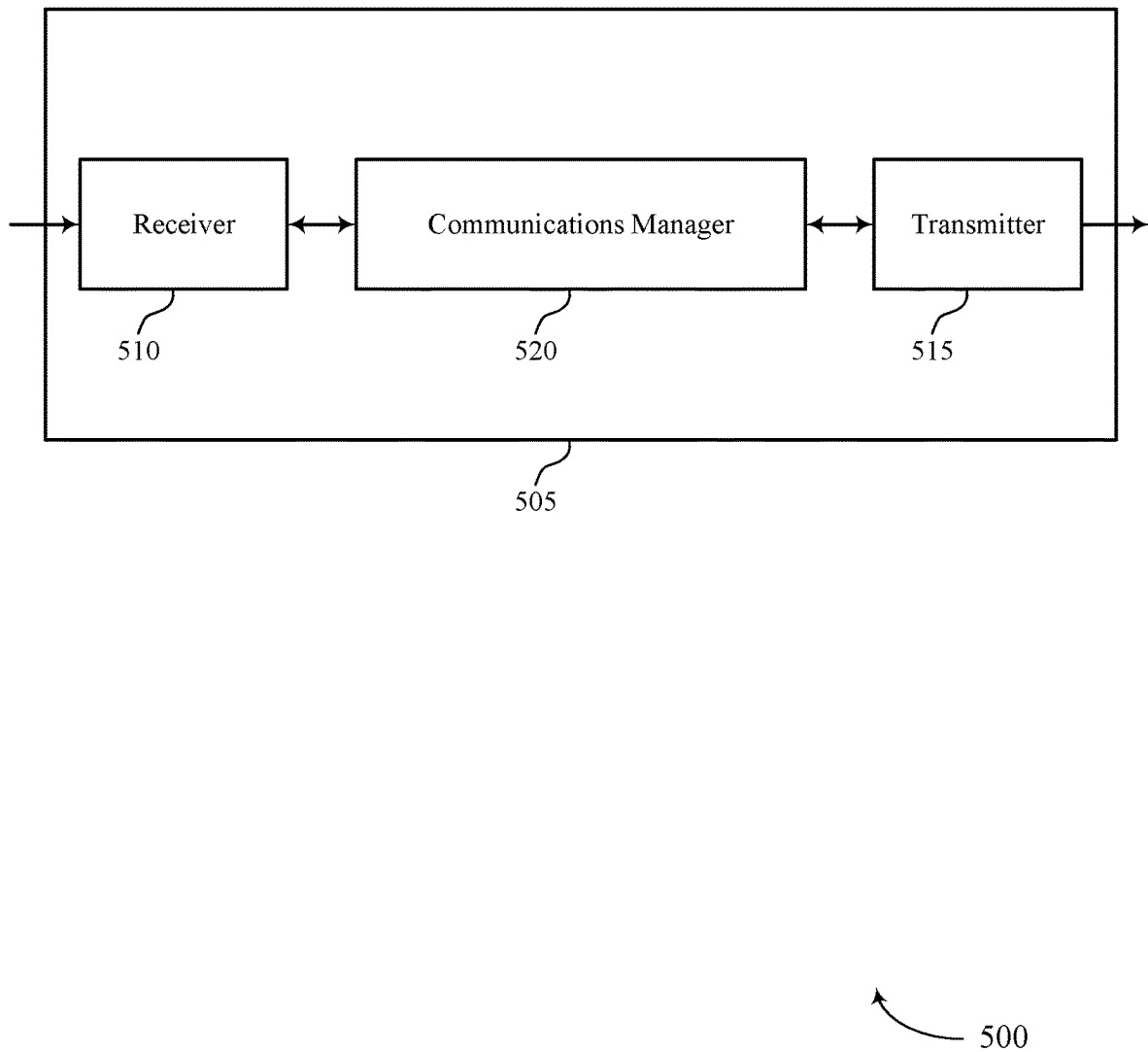
FIGS. 5 and 6 show block diagrams of devices that support techniques for interference cancellation in sidelink communication in accordance with one or more aspects of the present disclosure.

FIG. 5 shows a block diagram 500 of a device 505 that supports techniques for interference cancellation in sidelink communication in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for interference cancellation in sidelink communication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for interference cancellation in sidelink communication). In some examples, the transmitter 515 may be co-located with a receiver 510 in a transceiver. The transmitter 515 may utilize a single antenna or a set of multiple antennas.

The communications manager 520, the receiver 510, the transmitter 515, or various combinations thereof or various components thereof may be examples of means for performing various aspects of techniques for interference cancellation in sidelink communication as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at the device 505 (e.g., a UE) in accordance with examples as disclosed herein. For example, the communications manager 520 may be configured as or otherwise support a means for generating sidelink assistance information based on an interference condition associated with an initial transmission of sidelink communication over a sidelink resource of a sidelink resource pool, the sidelink assistance information including information associated with the interference condition. The communications manager 520 may be configured as or otherwise support a means for transmitting an inter-UE coordination message including the generated sidelink assistance information.

Additionally, or alternatively, the communications manager 520 may support wireless communication at the device 505 (e.g., a UE) in accordance with examples as disclosed herein. For example, the communications manager 520 may be configured as or otherwise support a means for receiving inter-UE coordination message including sidelink assistance information, the sidelink assistance information including information associated with an interference condition. The communications manager 520 may be configured as or otherwise support a means for receiving a retransmission of the sidelink communication. The communications manager 520 may be configured as or otherwise support a means for decoding the received retransmission of the sidelink communication based on the received inter-UE coordination message including the sidelink assistance information.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced power consumption.

Figure 6:
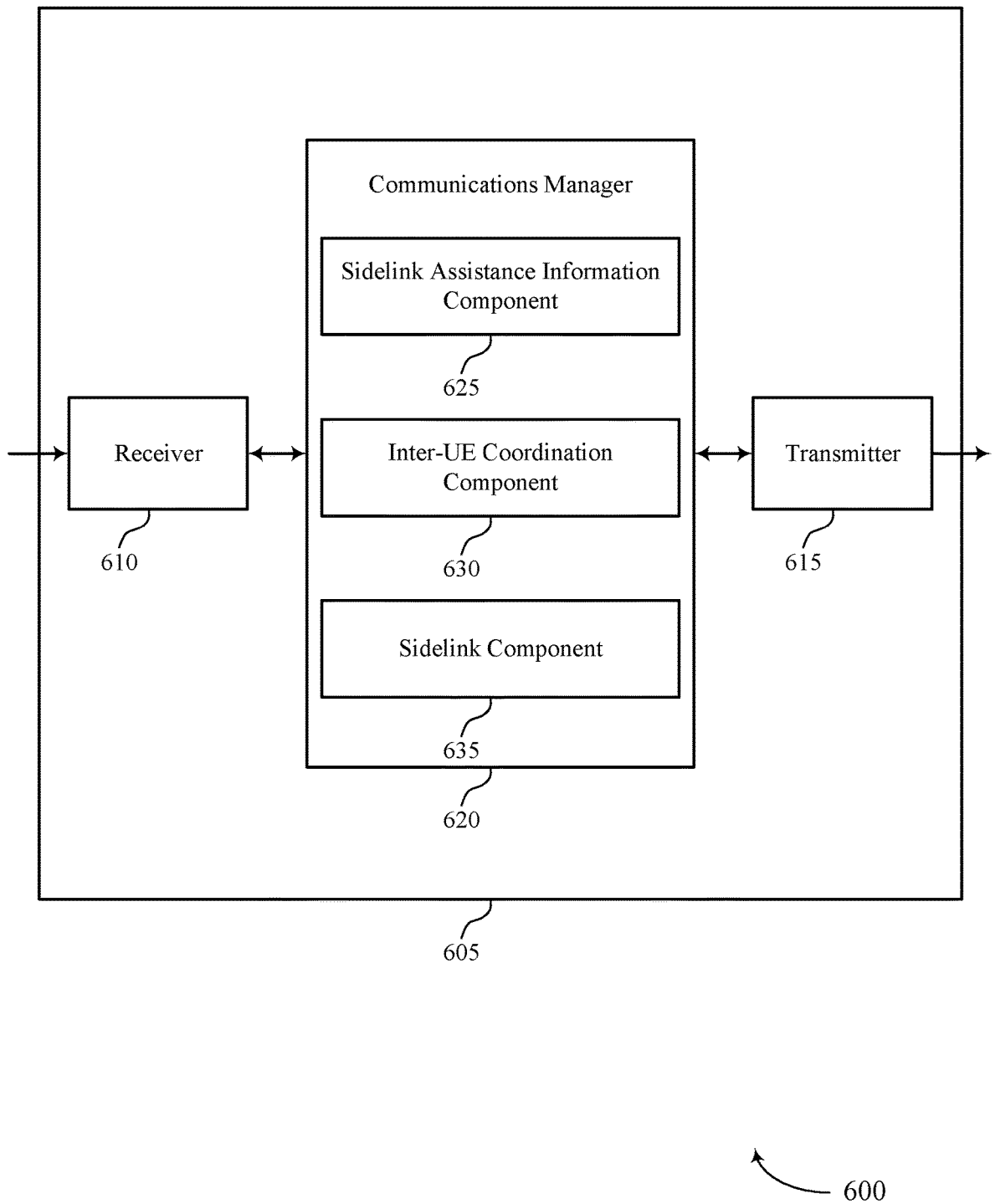

FIG. 6 shows a block diagram 600 of a device 605 that supports techniques for interference cancellation in sidelink communication in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for interference cancellation in sidelink communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for interference cancellation in sidelink communication). In some examples, the transmitter 615 may be co-located with a receiver 610 in a transceiver. The transmitter 615 may utilize a single antenna or a set of multiple antennas.

The device 605, or various components thereof, may be an example of means for performing various aspects of techniques for interference cancellation in sidelink communication as described herein. For example, the communications manager 620 may include a sidelink assistance information component 625, an inter-UE coordination component 630, a sidelink component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at the device 605 (e.g., a UE) in accordance with examples as disclosed herein. The sidelink assistance information component 625 may be configured as or otherwise support a means for generating sidelink assistance information based on an interference condition associated with an initial transmission of sidelink communication over a sidelink resource of a sidelink resource pool, the sidelink assistance information including information associated with the interference condition. The inter-UE coordination component 630 may be configured as or otherwise support a means for transmitting an inter-UE coordination message including the generated sidelink assistance information.

Additionally, or alternatively, the communications manager 620 may support wireless communication at the device 605 (e.g., a UE) in accordance with examples as disclosed herein. The inter-UE coordination component 630 may be configured as or otherwise support a means for receiving inter-UE coordination message including sidelink assistance information, the sidelink assistance information including information associated with an interference condition. The sidelink component 635 may be configured as or otherwise support a means for receiving a retransmission of the sidelink communication. The sidelink component 635 may be configured as or otherwise support a means for decoding the received retransmission of the sidelink communication based on the received inter-UE coordination message including the sidelink assistance information.

Figure 7:
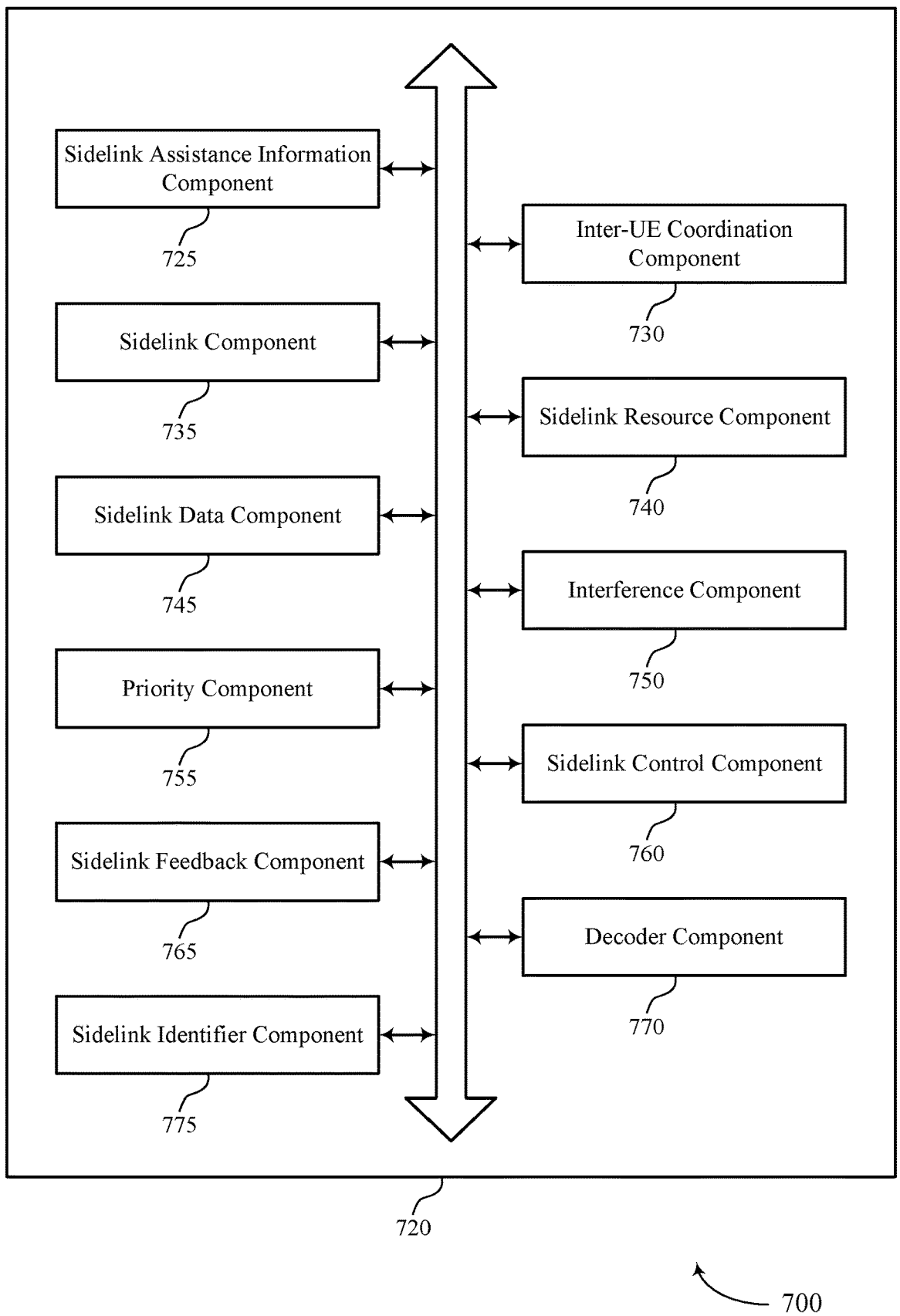
FIG. 7 shows a block diagram of a communications manager that supports techniques for interference cancellation in sidelink communication in accordance with one or more aspects of the present disclosure.

FIG. 7 shows a block diagram 700 of a communications manager 720 that supports techniques for interference cancellation in sidelink communication in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for interference cancellation in sidelink communication as described herein. For example, the communications manager 720 may include a sidelink assistance information component 725, an inter-UE coordination component 730, a sidelink component 735, a sidelink resource component 740, a sidelink data component 745, an interference component 750, a priority component 755, a sidelink control component 760, a sidelink feedback component 765, a decoder component 770, a sidelink identifier component 775, or any combination thereof. Each of these components may communicate, directly or indirectly, with one another (e.g., via one or more buses).

The communications manager 720 may support wireless communication at a UE in accordance with examples as disclosed herein. The sidelink assistance information component 725 may be configured as or otherwise support a means for generating sidelink assistance information based on an interference condition associated with an initial transmission of sidelink communication over a sidelink resource of a sidelink resource pool, the sidelink assistance information including information associated with the interference condition. The inter-UE coordination component 730 may be configured as or otherwise support a means for transmitting an inter-UE coordination message including the generated sidelink assistance information.

In some examples, the sidelink assistance information component 725 may be configured as or otherwise support a means for receiving a request for the sidelink assistance information. In some examples, the inter-UE coordination component 730 may be configured as or otherwise support a means for transmitting the inter-UE coordination message including the sidelink assistance information based on the request for the sidelink assistance information.

In some examples, the sidelink control component 760 may be configured as or otherwise support a means for receiving SCI, a MAC-CE, or an RRC message, or a combination thereof. In some examples, the SCI, the MAC-CE, or the RRC message includes the request for the sidelink assistance information.

In some examples, the sidelink feedback component 765 may be configured as or otherwise support a means for receiving a PSFCH during a PSFCH occasion, the PSFCH carrying the request for the sidelink assistance information.

In some examples, the request identifies a time and frequency resource location associated with a decoding failure of the initial transmission of the sidelink communication.

In some examples, the request identifies a CRC value, a modulation order, a MCS scheme, a resource allocation, a reference signal pattern, an offset value, or any combination thereof, associated with a different transmission of a different sidelink communication that overlaps with the initial transmission of the sidelink communication over the sidelink resource of the sidelink resource pool.

In some examples, the interference condition corresponds to one or more different transmissions of different sidelink communications that overlap with the initial transmission of the sidelink transmission over the sidelink resource of the sidelink resource pool.

In some examples, the sidelink resource component 740 may be configured as or otherwise support a means for receiving a different transmission of a different sidelink communication over the sidelink resource of the sidelink resource pool, the different transmission of the different sidelink communication corresponding to the interference condition associated with the initial transmission of the sidelink communication over the sidelink resource of the sidelink resource pool. In some examples, the sidelink assistance information component 725 may be configured as or otherwise support a means for generating the sidelink assistance information based on the different transmission of the different sidelink communication corresponding to the interference condition associated with the initial transmission of the sidelink communication.

In some examples, the sidelink resource component 740 may be configured as or otherwise support a means for determining a set of multiple different transmissions of different sidelink communication overlapping with the initial transmission of the sidelink communication or one or more future transmissions of the sidelink communication over one or more sidelink resources of the sidelink resource pool. In some examples, the sidelink assistance information component 725 may be configured as or otherwise support a means for generating the sidelink assistance information based on the set of multiple different sidelink communications overlapping with the initial transmission of the sidelink communication or the one or more future transmissions of the sidelink communication, and where the sidelink assistance information indicates an interference associated with the overlapping.

In some examples, the sidelink data component 745 may be configured as or otherwise support a means for multiplexing the inter-UE coordination message including the sidelink assistance information with a sidelink data transmission. In some examples, the inter-UE coordination component 730 may be configured as or otherwise support a means for transmitting the inter-UE coordination message including the sidelink assistance information based on the multiplexing.

In some examples, the interference component 750 may be configured as or otherwise support a means for determining that a quantity of interference conditions associated with sidelink communications satisfies a threshold, one or more of the quantity of interference conditions corresponding to a previous interference of a future interference associated with sidelink communications. In some examples, the inter-UE coordination component 730 may be configured as or otherwise support a means for transmitting the inter-UE coordination message including the sidelink assistance information based on the determined quantity of interference conditions satisfying the threshold.

In some examples, the sidelink assistance information indicates overlapping sidelink transmissions, overlapping sidelink resource reservations, a resource allocation for each overlapping sidelink transmission of the overlapping sidelink transmissions, or a combination thereof.

In some examples, the priority component 755 may be configured as or otherwise support a means for receiving a first sidelink transmission and a second sidelink transmission, the first sidelink transmission corresponding to a first priority and the second sidelink transmission corresponding to a second priority different than the first priority, the first sidelink transmission and the second sidelink transmission correspond to the interference condition associated with an initial transmission of sidelink communication. In some examples, the sidelink assistance information component 725 may be configured as or otherwise support a means for generating the sidelink assistance information based on the first sidelink transmission and the second sidelink transmission.

In some examples, the sidelink assistance information includes information associated with the first sidelink transmission or the second sidelink transmission, or both, based on the first priority or the second priority, or both.

In some examples, the sidelink assistance information includes information associated with the first sidelink transmission or the second sidelink transmission, or both, based on a reference signal received power (RSRP) value associated with the first sidelink transmission or the second sidelink transmission, or both.

Additionally, or alternatively, the communications manager 720 may support wireless communication at a UE in accordance with examples as disclosed herein. In some examples, the inter-UE coordination component 730 may be configured as or otherwise support a means for receiving inter-UE coordination message including sidelink assistance information, the sidelink assistance information including information associated with an interference condition. The sidelink component 735 may be configured as or otherwise support a means for receiving a retransmission of the sidelink communication. In some examples, the sidelink component 735 may be configured as or otherwise support a means for decoding the received retransmission of the sidelink communication based on the received inter-UE coordination message including the sidelink assistance information.

In some examples, the interference component 750 may be configured as or otherwise support a means for determining an interference condition associated with an initial transmission of the sidelink communication over a sidelink resource of a sidelink resource pool based on a failure to decode the initial transmission of the sidelink communication. In some examples, the sidelink assistance information component 725 may be configured as or otherwise support a means for transmitting a request for the sidelink assistance information based on the determined interference condition associated with the initial transmission of the sidelink communication. In some examples, the inter-UE coordination component 730 may be configured as or otherwise support a means for receiving the inter-UE coordination message including the sidelink assistance information based on the transmitted request for the sidelink assistance information.

In some examples, the sidelink control component 760 may be configured as or otherwise support a means for transmitting SCI, a MAC-CE, or an RRC message, or a combination thereof. In some examples, the SCI, the MAC-CE, or the RRC message includes the request for the sidelink assistance information.

In some examples, the decoder component 770 may be configured as or otherwise support a means for determining a quantity of failures to decode the sidelink communication. In some examples, the sidelink assistance information component 725 may be configured as or otherwise support a means for transmitting the request for the sidelink assistance information based on the determined quantity of failures satisfying a threshold.

In some examples, the decoder component 770 may be configured as or otherwise support a means for decoding a PSCCH associated with the initial transmission of the sidelink communication. In some examples, the failure to decode the initial transmission of the sidelink communications corresponds to a lack of decoding a transport block indicated by the PSCCH associated with the initial transmission of the sidelink communication.

In some examples, to support determining the interference condition, the interference component 750 may be configured as or otherwise support a means for detecting a sidelink reference signal associated with a different transmission of a different sidelink communication, the sidelink reference signal including a DMRS of a PSCCH.

In some examples, to support determining the interference condition, the interference component 750 may be configured as or otherwise support a means for determining that an RSRP value or a reference signal received quality (RSRQ) value associated with an initial transmission of the sidelink communication satisfies a threshold.

In some examples, the assistance information is preconfigured.

In some examples, the sidelink identifier component 775 may be configured as or otherwise support a means for determining that a recipient of the initial transmission of the sidelink communication includes the UE based on SCI of the initial transmission of the sidelink communication, the SCI indicating a destination identifier. In some examples, the sidelink assistance information component 725 may be configured as or otherwise support a means for transmitting the request for the sidelink assistance information based on the determining that the recipient of the initial transmission of the sidelink communication includes the UE.

In some examples, the sidelink feedback component 765 may be configured as or otherwise support a means for transmitting a PSFCH during a PSFCH occasion, the PSFCH carrying the request for the sidelink assistance information.

In some examples, the request identifies a time and frequency resource location associated with the failure to decode the initial transmission of the sidelink communication.

In some examples, the request identifies a CRC value, a modulation order, a MCS scheme, a resource allocation, a reference signal pattern, an offset value, or any combination thereof, associated with a different transmission of a different sidelink communication that overlaps with the initial transmission of the sidelink communication over a sidelink resource of a sidelink resource pool.

In some examples, the interference condition corresponds to one or more different transmissions of different sidelink communications that overlap with the initial transmission of the sidelink transmission over the sidelink resource of the sidelink resource pool.

Figure 8:
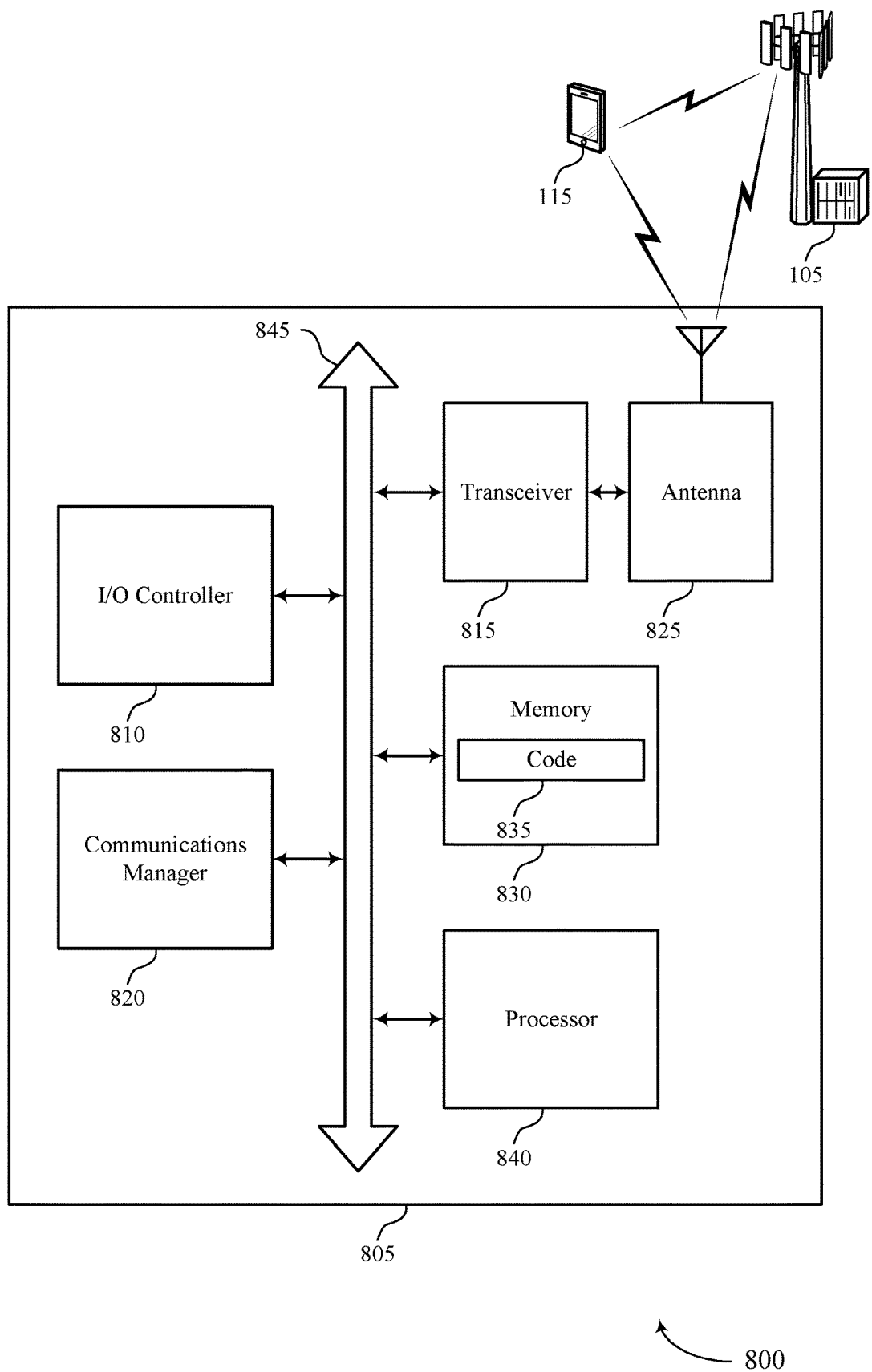
FIG. 8 shows a diagram of a system including a device that supports techniques for interference cancellation in sidelink communication in accordance with one or more aspects of the present disclosure.

FIG. 8 shows a diagram of a system 800 including a device 805 that supports techniques for interference cancellation in sidelink communication in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825.

The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for interference cancellation in sidelink communication). For example, the device 805 or a component of the device 805 may include a processor 840 and memory 830 coupled with or to the processor 840, the processor 840 and memory 830 configured to perform various functions described herein.

The communications manager 820 may support wireless communication at the device 805 (e.g., a UE) in accordance with examples as disclosed herein. For example, the communications manager 820 may be configured as or otherwise support a means for generating sidelink assistance information based on an interference condition associated with an initial transmission of sidelink communication over a sidelink resource of a sidelink resource pool, the sidelink assistance information including information associated with the interference condition. The communications manager 820 may be configured as or otherwise support a means for transmitting an inter-UE coordination message including the generated sidelink assistance information.

Additionally, or alternatively, the communications manager 820 may support wireless communication at the device 805 (e.g., a UE) in accordance with examples as disclosed herein. For example, the communications manager 820 may be configured as or otherwise support a means for receiving inter-UE coordination message including sidelink assistance information, the sidelink assistance information including information associated with an interference condition. The communications manager 820 may be configured as or otherwise support a means for receiving a retransmission of the sidelink communication. The communications manager 820 may be configured as or otherwise support a means for decoding the received retransmission of the sidelink communication based on the received inter-UE coordination message including the sidelink assistance information.

By including or configuring the communications manager 820 in accordance with examples as described herein, the device 805 may support techniques for improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for interference cancellation in sidelink communication as described herein, or the processor 840 and the memory 830 may be otherwise configured to perform or support such operations.

Figure 9:
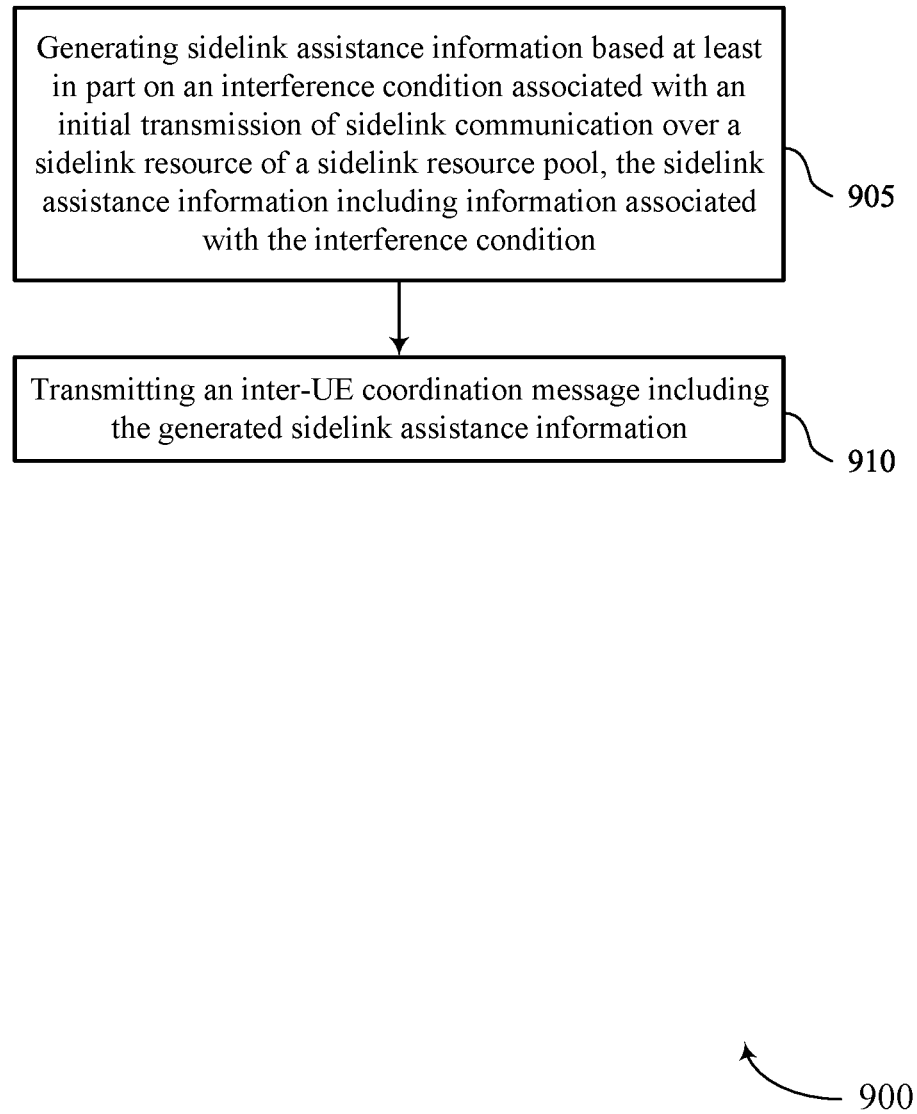
FIGS. 9 through 12 show flowcharts illustrating methods that support techniques for interference cancellation in sidelink communication in accordance with one or more aspects of the present disclosure.

FIG. 9 shows a flowchart illustrating a method 900 that supports techniques for interference cancellation in sidelink communication in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include generating sidelink assistance information based on an interference condition associated with an initial transmission of sidelink communication over a sidelink resource of a sidelink resource pool, the sidelink assistance information including information associated with the interference condition. The operations of 905 may be performed in accordance with examples as disclosed herein. In some examples, aspects of the operations of 905 may be performed by a sidelink assistance information component 725 as described with reference to FIG. 7.

At 910, the method may include transmitting an inter-UE coordination message including the generated sidelink assistance information. The operations of 910 may be performed in accordance with examples as disclosed herein. In some examples, aspects of the operations of 910 may be performed by an inter-UE coordination component 730 as described with reference to FIG. 7.

Figure 10:
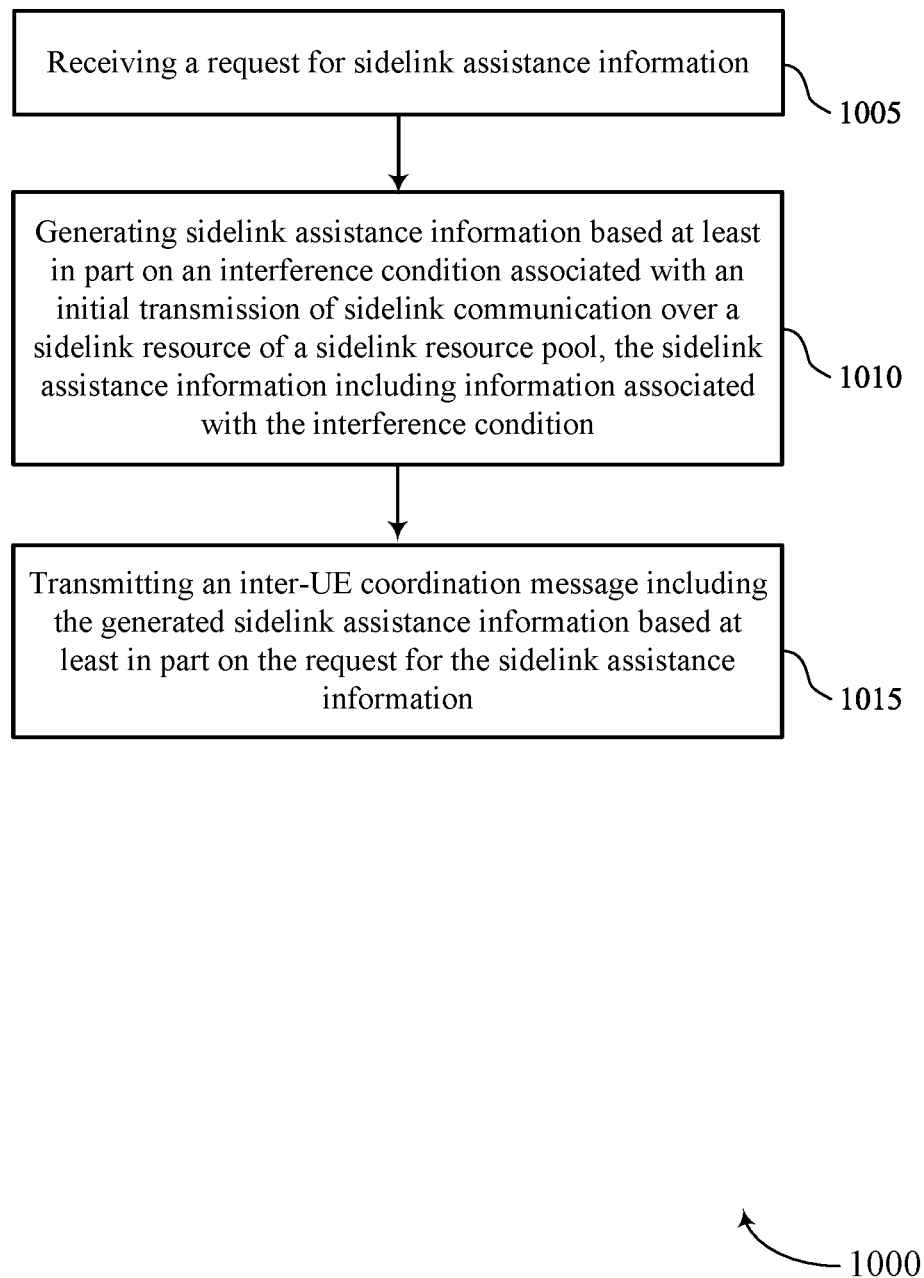

FIG. 10 shows a flowchart illustrating a method 1000 that supports techniques for interference cancellation in sidelink communication in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving a request for sidelink assistance information. The operations of 1005 may be performed in accordance with examples as disclosed herein. In some examples, aspects of the operations of 1005 may be performed by a sidelink assistance information component 725 as described with reference to FIG. 7.

At 1010, the method may include generating the sidelink assistance information based on an interference condition associated with an initial transmission of sidelink communication over a sidelink resource of a sidelink resource pool, the sidelink assistance information including information associated with the interference condition. The operations of 1010 may be performed in accordance with examples as disclosed herein. In some examples, aspects of the operations of 1010 may be performed by a sidelink assistance information component 725 as described with reference to FIG. 7.

At 1015, the method may include transmitting an inter-UE coordination message including the generated sidelink assistance information based on the request for the sidelink assistance information. The operations of 1015 may be performed in accordance with examples as disclosed herein. In some examples, aspects of the operations of 1015 may be performed by an inter-UE coordination component 730 as described with reference to FIG. 7.

Figure 11:
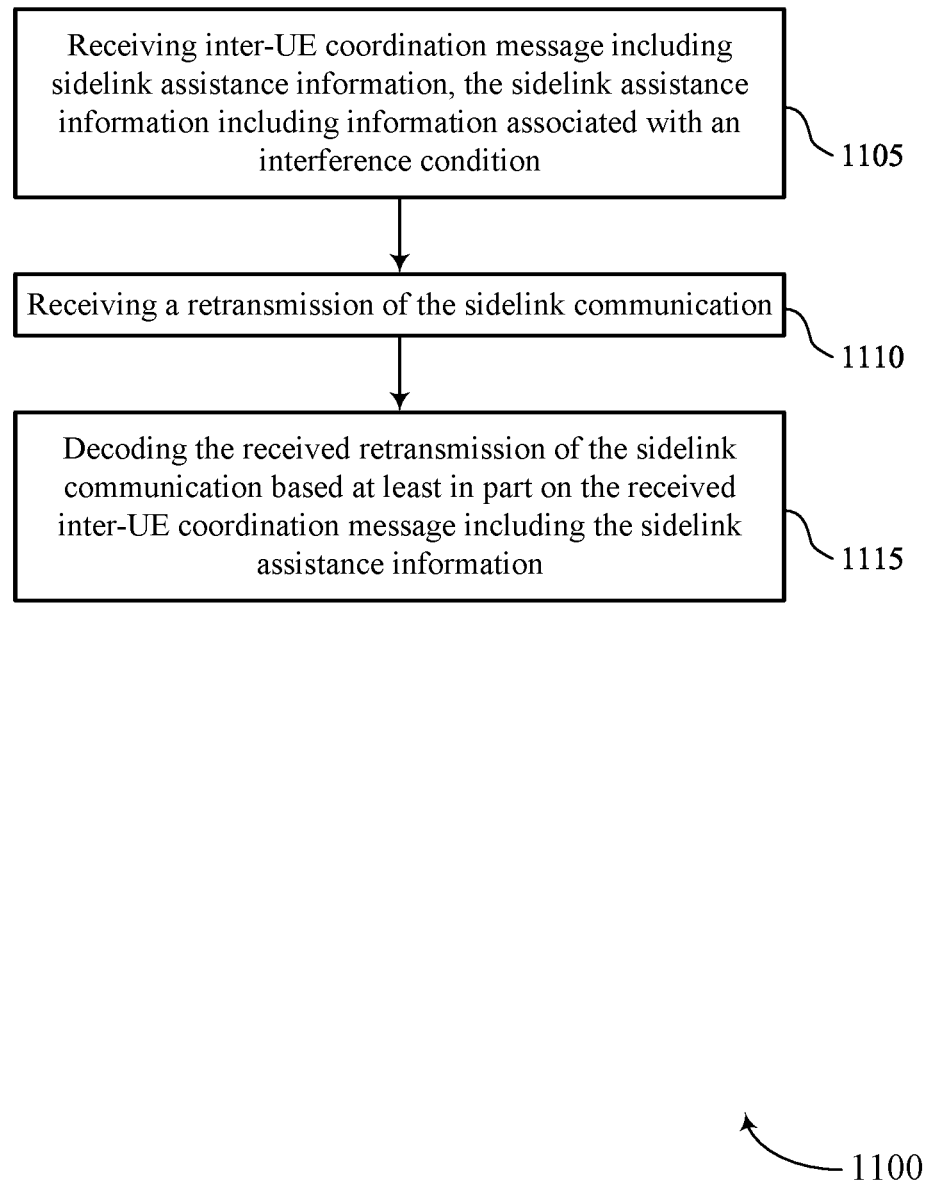

FIG. 11 shows a flowchart illustrating a method 1100 that supports techniques for interference cancellation in sidelink communication in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving inter-UE coordination message including sidelink assistance information, the sidelink assistance information including information associated with an interference condition. The operations of 1105 may be performed in accordance with examples as disclosed herein. In some examples, aspects of the operations of 1105 may be performed by an inter-UE coordination component 730 as described with reference to FIG. 7.

At 1110, the method may include receiving a retransmission of the sidelink communication. The operations of 1110 may be performed in accordance with examples as disclosed herein. In some examples, aspects of the operations of 1110 may be performed by a sidelink component 735 as described with reference to FIG. 7.

At 1115, the method may include decoding the received retransmission of the sidelink communication based on the received inter-UE coordination message including the sidelink assistance information. The operations of 1115 may be performed in accordance with examples as disclosed herein. In some examples, aspects of the operations of 1115 may be performed by a sidelink component 735 as described with reference to FIG. 7.

Figure 12:
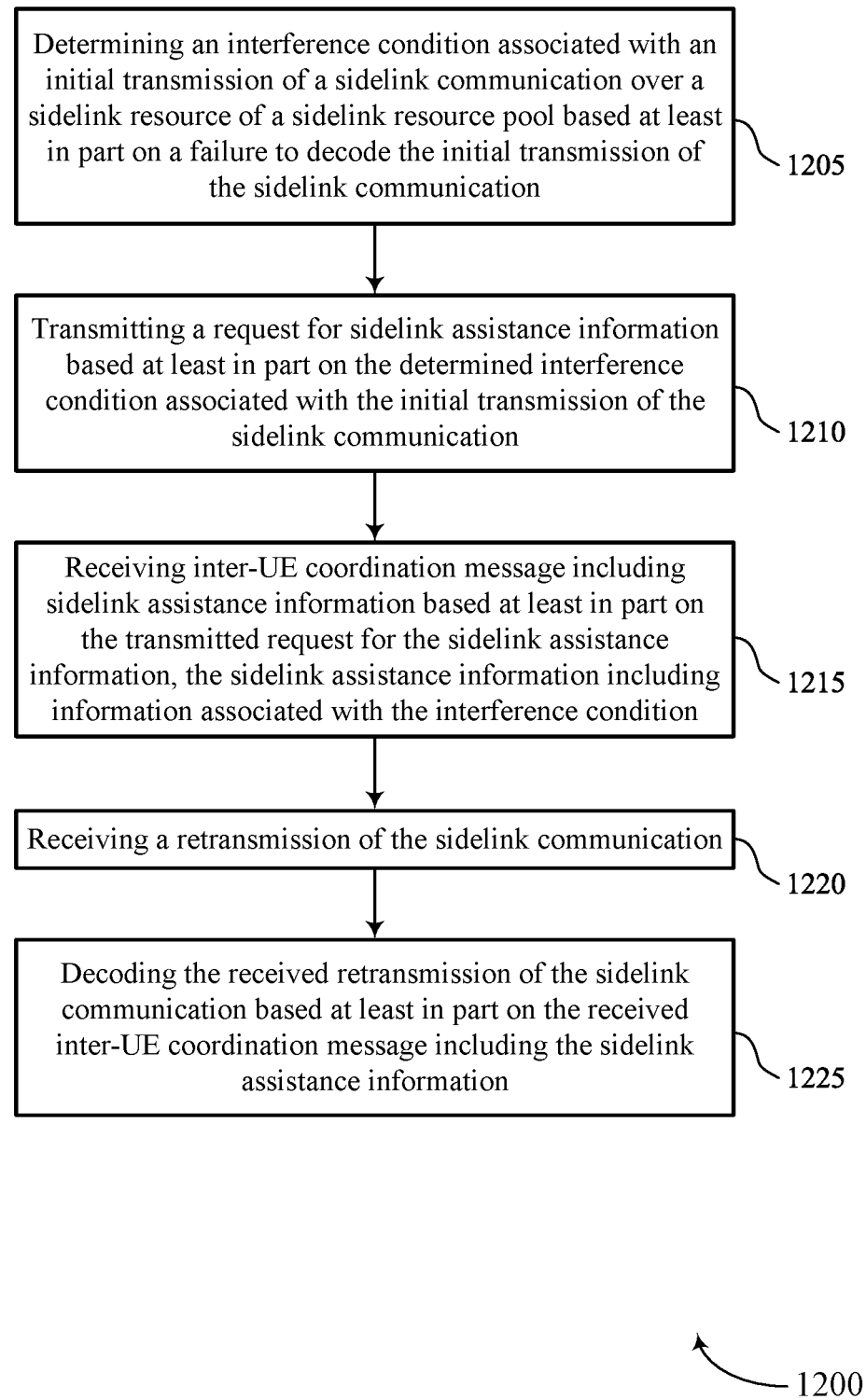

FIG. 12 shows a flowchart illustrating a method 1200 that supports techniques for interference cancellation in sidelink communication in accordance with one or more aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include determining an interference condition associated with an initial transmission of a sidelink communication over a sidelink resource of a sidelink resource pool based on a failure to decode the initial transmission of the sidelink communication. The operations of 1205 may be performed in accordance with examples as disclosed herein. In some examples, aspects of the operations of 1205 may be performed by an interference component 750 as described with reference to FIG. 7.

At 1210, the method may include transmitting a request for sidelink assistance information based on the determined interference condition associated with the initial transmission of the sidelink communication. The operations of 1210 may be performed in accordance with examples as disclosed herein. In some examples, aspects of the operations of 1210 may be performed by a sidelink assistance information component 725 as described with reference to FIG. 7.

At 1215, the method may include where receiving the inter-UE coordination message including the sidelink assistance information is based on the transmitted request for the sidelink assistance information. The operations of 1215 may be performed in accordance with examples as disclosed herein. In some examples, aspects of the operations of 1215 may be performed by an inter-UE coordination component 730 as described with reference to FIG. 7.

At 1220, the method may include receiving inter-UE coordination message including sidelink assistance information, the sidelink assistance information including information associated with the interference condition. The operations of 1220 may be performed in accordance with examples as disclosed herein. In some examples, aspects of the operations of 1220 may be performed by an inter-UE coordination component 730 as described with reference to FIG. 7.

At 1225, the method may include receiving a retransmission of the sidelink communication. The operations of 1225 may be performed in accordance with examples as disclosed herein. In some examples, aspects of the operations of 1225 may be performed by a sidelink component 735 as described with reference to FIG. 7.

At 1230, the method may include decoding the received retransmission of the sidelink communication based on the received inter-UE coordination message including the sidelink assistance information. The operations of 1230 may be performed in accordance with examples as disclosed herein. In some examples, aspects of the operations of 1230 may be performed by a sidelink component 735 as described with reference to FIG. 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: generating sidelink assistance information based at least in part on an interference condition associated with an initial transmission of sidelink communication over a sidelink resource of a sidelink resource pool, the sidelink assistance information comprising information associated with the interference condition; and transmitting an inter-UE coordination message including the generated sidelink assistance information.

Aspect 2: The method of aspect 1, further comprising: receiving a request for the sidelink assistance information, wherein transmitting the inter-UE coordination message including the sidelink assistance information is based at least in part on the request for the sidelink assistance information.

Aspect 3: The method of aspect 2, further comprising: receiving SCI, a MAC-CE, or a RRC message, or a combination thereof, wherein the SCI, the MAC-CE, or the RRC message includes the request for the sidelink assistance information.

Aspect 4: The method of any of aspects 2 through 3, further comprising: receiving a PSFCH during a PSFCH occasion, the PSFCH carrying the request for the sidelink assistance information.

Aspect 5: The method of any of aspects 2 through 4, wherein the request identifies a time and frequency resource location associated with a decoding failure of the initial transmission of the sidelink communication.

Aspect 6: The method of any of aspects 2 through 5, wherein the request identifies a cyclic redundancy check value, a modulation order, a modulation coding scheme, a resource allocation, a reference signal pattern, an offset value, or any combination thereof, associated with a different transmission of a different sidelink communication that overlaps with the initial transmission of the sidelink communication over the sidelink resource of the sidelink resource pool.

Aspect 7: The method of any of aspects 1 through 6, wherein the interference condition corresponds to one or more different transmissions of different sidelink communications that overlap with the initial transmission of the sidelink transmission over the sidelink resource of the sidelink resource pool.

Aspect 8: The method of any of aspects 1 through 7, further comprising: receiving a different transmission of a different sidelink communication over the sidelink resource of the sidelink resource pool, the different transmission of the different sidelink communication corresponding to the interference condition associated with the initial transmission of the sidelink communication over the sidelink resource of the sidelink resource pool, wherein generating the sidelink assistance information is based at least in part on the different transmission of the different sidelink communication corresponding to the interference condition associated with the initial transmission of the sidelink communication.

Aspect 9: The method of any of aspects 1 through 8, further comprising: determining a plurality of different transmissions of different sidelink communication overlapping with the initial transmission of the sidelink communication or one or more future transmissions of the sidelink communication over one or more sidelink resources of the sidelink resource pool, wherein generating the sidelink assistance information is based at least in part on the plurality of different sidelink communications overlapping with the initial transmission of the sidelink communication or the one or more future transmissions of the sidelink communication, and wherein the sidelink assistance information indicates an interference associated with the overlapping.

Aspect 10: The method of any of aspects 1 through 9, further comprising: multiplexing the inter-UE coordination message including the sidelink assistance information with a sidelink data transmission, wherein transmitting the inter-UE coordination message including the sidelink assistance information is based at least in part on the multiplexing.

Aspect 11: The method of any of aspects 1 through 10, further comprising: determining that a quantity of interference conditions associated with sidelink communications satisfies a threshold, one or more of the quantity of interference conditions corresponding to a previous interference of a future interference associated with sidelink communications, wherein transmitting the inter-UE coordination message including the sidelink assistance information is based at least in part on the determined quantity of interference conditions satisfying the threshold.

Aspect 12: The method of aspect 11, wherein the sidelink assistance information indicates overlapping sidelink transmissions, overlapping sidelink resource reservations, a resource allocation for each overlapping sidelink transmission of the overlapping sidelink transmissions, or a combination thereof.

Aspect 13: The method of any of aspects 1 through 12, further comprising: receiving a first sidelink transmission and a second sidelink transmission, the first sidelink transmission corresponding to a first priority and the second sidelink transmission corresponding to a second priority different than the first priority, the first sidelink transmission and the second sidelink transmission correspond to the interference condition associated with an initial transmission of sidelink communication, wherein generating the sidelink assistance information is based at least in part on the first sidelink transmission and the second sidelink transmission.

Aspect 14: The method of aspect 13, wherein the sidelink assistance information comprises information associated with the first sidelink transmission or the second sidelink transmission, or both, based at least in part on the first priority or the second priority, or both.

Aspect 15: The method of any of aspects 13 through 14, wherein the sidelink assistance information comprises information associated with the first sidelink transmission or the second sidelink transmission, or both, based at least in part on a RSRP value associated with the first sidelink transmission or the second sidelink transmission, or both.

Aspect 16: A method for wireless communication at a UE, comprising: receiving inter-UE coordination message including sidelink assistance information, the sidelink assistance information comprising information associated with an interference condition; receiving a retransmission of the sidelink communication; and decoding the received retransmission of the sidelink communication based at least in part on the received inter-UE coordination message including the sidelink assistance information.

Aspect 17: The method of aspect 16, further comprising: determining an interference condition associated with an initial transmission of the sidelink communication over a sidelink resource of a sidelink resource pool based at least in part on a failure to decode the initial transmission of the sidelink communication; and transmitting a request for the sidelink assistance information based at least in part on the determined interference condition associated with the initial transmission of the sidelink communication, wherein receiving the inter-UE coordination message including the sidelink assistance information is based at least in part on the transmitted request for the sidelink assistance information.

Aspect 18: The method of aspect 17, further comprising: transmitting SCI, a MAC-CE, or a RRC message, or a combination thereof, wherein the SCI, the MAC-CE, or the RRC message includes the request for the sidelink assistance information.

Aspect 19: The method of any of aspects 17 through 18, further comprising: determining a quantity of failures to decode the sidelink communication, wherein transmitting the request for the sidelink assistance information based at least in part on the determined quantity of failures satisfying a threshold.

Aspect 20: The method of any of aspects 17 through 19, further comprising: decoding a PSCCH associated with the initial transmission of the sidelink communication, wherein the failure to decode the initial transmission of the sidelink communications corresponds to a lack of decoding a transport block indicated by the PSCCH associated with the initial transmission of the sidelink communication.

Aspect 21: The method of any of aspects 17 through 20, wherein determining the interference condition comprises: detecting a sidelink reference signal associated with a different transmission of a different sidelink communication, the sidelink reference signal comprising a demodulation reference signal of a PSCCH.

Aspect 22: The method of any of aspects 17 through 21, wherein determining the interference condition comprises: determining a that RSRP value or a RSRQ value associated with an initial transmission of the sidelink communication satisfies a threshold.

Aspect 23: The method of any of aspects 17 through 22, wherein the assistance information is preconfigured.

Aspect 24: The method of any of aspects 17 through 23, further comprising: determining that a recipient of the initial transmission of the sidelink communication includes the UE based at least in part on SCI of the initial transmission of the sidelink communication, the SCI indicating a destination identifier, wherein transmitting the request for the sidelink assistance information is based at least in part on the determining that the recipient of the initial transmission of the sidelink communication includes the UE.

Aspect 25: The method of any of aspects 17 through 24, further comprising: transmitting a PSFCH during a PSFCH occasion, the PSFCH carrying the request for the sidelink assistance information.

Aspect 26: The method of any of aspects 17 through 25, wherein the request identifies a time and frequency resource location associated with the failure to decode the initial transmission of the sidelink communication.

Aspect 27: The method of any of aspects 17 through 26, wherein the request identifies a cyclic redundancy check value, a modulation order, a modulation and coding scheme (MCS), a resource allocation, a reference signal pattern, an offset value, or any combination thereof, associated with a different transmission of a different sidelink communication that overlaps with the initial transmission of the sidelink communication over a sidelink resource of a sidelink resource pool.

Aspect 28: The method of any of aspects 17 through 27, wherein the interference condition corresponds to one or more different transmissions of different sidelink communications that overlap with the initial transmission of the sidelink transmission over the sidelink resource of the sidelink resource pool.

Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a UE, comprising a processor; memory coupled with the processor; and instructions stored in the memory and executable by the processor to cause the apparatus to perform a method of any of aspects 16 through 28.

Aspect 33: An apparatus for wireless communication at a UE, comprising at least one means for performing a method of any of aspects 16 through 28.

Aspect 34: A non-transitory computer-readable medium storing code for wireless communication at a UE, the code comprising instructions executable by a processor to perform a method of any of aspects 16 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
  receiving a request for sidelink assistance information following an initial transmission of a sidelink communication over a sidelink resource of a sidelink resource pool, wherein the sidelink assistance information is associated with an interference condition associated with the initial transmission;
  generating the sidelink assistance information based at least in part on the interference condition associated with the initial transmission, the sidelink assistance information including information associated with the interference condition, wherein the initial transmission occurs prior to the generating; and
  transmitting an inter-UE coordination message including the generated sidelink assistance information based at least in part on the request.

2. The method of claim 1, further comprising:
  receiving sidelink control information, a medium access control-control element, or a radio resource control message, or a combination thereof,
  wherein the sidelink control information, the medium access control-control element, or the radio resource control message includes the request for the sidelink assistance information.

3. The method of claim 1, further comprising:
  receiving a physical sidelink feedback channel during a physical sidelink feedback channel occasion, the physical sidelink feedback channel carrying the request for the sidelink assistance information.

4. The method of claim 1, wherein the request identifies a time and frequency resource location associated with a decoding failure of the initial transmission of the sidelink communication.

5. The method of claim 1, wherein the request identifies a cyclic redundancy check value, a modulation order, a modulation and coding scheme, a resource allocation, a reference signal pattern, an offset value, or any combination thereof, associated with a different transmission of a different sidelink communication that overlaps with the initial transmission of the sidelink communication over the sidelink resource of the sidelink resource pool.

6. The method of claim 1, wherein the interference condition corresponds to one or more different transmissions of different sidelink communications that overlap with the initial transmission of the sidelink communication over the sidelink resource of the sidelink resource pool.

7. The method of claim 1, further comprising:
  receiving a different transmission of a different sidelink communication over the sidelink resource of the sidelink resource pool, the different transmission of the different sidelink communication corresponding to the interference condition associated with the initial transmission of the sidelink communication over the sidelink resource of the sidelink resource pool,
  wherein generating the sidelink assistance information is based at least in part on the different transmission of the different sidelink communication corresponding to the interference condition associated with the initial transmission of the sidelink communication.

8. The method of claim 1, further comprising:
  determining a plurality of different transmissions of a plurality of different sidelink communications overlapping with the initial transmission of the sidelink communication or one or more future transmissions of the sidelink communication over one or more sidelink resources of the sidelink resource pool,
  wherein generating the sidelink assistance information is based at least in part on the plurality of different sidelink communications overlapping with the initial transmission of the sidelink communication or the one or more future transmissions of the sidelink communication, and wherein the sidelink assistance information indicates an interference associated with the overlapping.

9. The method of claim 1, further comprising:
  multiplexing the inter-UE coordination message including the sidelink assistance information with a sidelink data transmission,
  wherein transmitting the inter-UE coordination message including the sidelink assistance information is based at least in part on the multiplexing.

10. The method of claim 1, further comprising:
  determining that a quantity of interference conditions associated with sidelink communications satisfies a threshold, one or more of the quantity of interference conditions corresponding to a previous interference of a future interference associated with sidelink communications,
  wherein transmitting the inter-UE coordination message including the sidelink assistance information is based at least in part on the determined quantity of interference conditions satisfying the threshold.

11. The method of claim 10, wherein the sidelink assistance information indicates overlapping sidelink transmissions, overlapping sidelink resource reservations, a resource allocation for each overlapping sidelink transmission of the overlapping sidelink transmissions, or a combination thereof.

12. The method of claim 1, further comprising:
  receiving a first sidelink transmission and a second sidelink transmission, the first sidelink transmission corresponding to a first priority and the second sidelink transmission corresponding to a second priority different than the first priority, the first sidelink transmission and the second sidelink transmission correspond to the interference condition associated with an initial transmission of sidelink communication,
  wherein generating the sidelink assistance information is based at least in part on the first sidelink transmission and the second sidelink transmission.

13. The method of claim 12, wherein the sidelink assistance information comprises information associated with the first sidelink transmission or the second sidelink transmission, or both, based at least in part on the first priority or the second priority, or both.

14. The method of claim 12, wherein the sidelink assistance information comprises information associated with the first sidelink transmission or the second sidelink transmission, or both, based at least in part on a reference signal received power (RSRP) value associated with the first sidelink transmission or the second sidelink transmission, or both.

15. A method for wireless communication at a user equipment (UE), comprising:
transmitting a request for sidelink assistance information following an initial transmission of a sidelink communication over a sidelink resource of a sidelink resource pool, wherein the sidelink assistance information is associated with an interference condition associated with the initial transmission;
receiving an inter-UE coordination message including the sidelink assistance information based at least in part on the request, the sidelink assistance information including information associated with the interference condition associated with the initial transmission, wherein the initial transmission occurs prior to receiving the inter-UE coordination message;
receiving a retransmission of the sidelink communication; and
decoding the received retransmission of the sidelink communication based at least in part on the received inter-UE coordination message including the sidelink assistance information.

16. The method of claim 15, further comprising:
determining the interference condition associated with the initial transmission of the sidelink communication based at least in part on a failure to decode the initial transmission of the sidelink communication,
wherein transmitting the request for the sidelink assistance information is based at least in part on the determined interference condition associated with the initial transmission of the sidelink communication.

17. The method of claim 15, further comprising:
transmitting sidelink control information, a medium access control-control element, or a radio resource control message, or a combination thereof,
wherein the sidelink control information, the medium access control-control element, or the radio resource control message includes the request for the sidelink assistance information.

18. The method of claim 16, further comprising:
determining a quantity of failures to decode the sidelink communication,
wherein transmitting the request for the sidelink assistance information based at least in part on the determined quantity of failures satisfying a threshold.

19. The method of claim 16, further comprising:
decoding a physical sidelink control channel associated with the initial transmission of the sidelink communication,
wherein the failure to decode the initial transmission of the sidelink communication corresponds to a lack of decoding a transport block indicated by the physical sidelink control channel associated with the initial transmission of the sidelink communication.

20. The method of claim 16, wherein determining the interference condition comprises:
detecting a sidelink reference signal associated with a different transmission of a different sidelink communication, the sidelink reference signal including a demodulation reference signal of a physical sidelink control channel.

21. The method of claim 16, wherein determining the interference condition comprises:
determining that a reference signal received power (RSRP) value or a reference signal received quality (RSRQ) value associated with an initial transmission of the sidelink communication satisfies a threshold.

22. The method of claim 15, wherein the sidelink assistance information is preconfigured.

23. The method of claim 15, further comprising:
determining that a recipient of the initial transmission of the sidelink communication includes the UE based at least in part on sidelink control information of the initial transmission of the sidelink communication, the sidelink control information indicating a destination identifier,
wherein transmitting the request for the sidelink assistance information is based at least in part on the determining that the recipient of the initial transmission of the sidelink communication includes the UE.

24. The method of claim 15, further comprising:
transmitting a physical sidelink feedback channel during a physical sidelink feedback channel occasion, the physical sidelink feedback channel carrying the request for the sidelink assistance information.

25. The method of claim 16, wherein the request identifies a time and frequency resource location associated with the failure to decode the initial transmission of the sidelink communication.

26. The method of claim 15, wherein the request identifies a cyclic redundancy check value, a modulation order, a modulation and coding scheme, a resource allocation, a reference signal pattern, an offset value, or any combination thereof, associated with a different transmission of a different sidelink communication that overlaps with the initial transmission of the sidelink communication over a sidelink resource of a sidelink resource pool.

27. The method of claim 15, wherein the interference condition corresponds to one or more different transmissions of different sidelink communications that overlap with the initial transmission of the sidelink communication over the sidelink resource of the sidelink resource pool.

28. An apparatus for wireless communication at a user equipment (UE), comprising:
a processor;
memory coupled with the processor; and
instructions stored in the memory and executable by the processor to cause the apparatus to:
receive a request for sidelink assistance information following an initial transmission of a sidelink communication over a sidelink resource of a sidelink resource pool, wherein the sidelink assistance information is associated with an interference condition associated with the initial transmission;
generate the sidelink assistance information based at least in part on the interference condition associated with the initial transmission, the sidelink assistance information including information associated with the interference condition, wherein the initial transmission occurs prior to the generating; and
transmit an inter-UE coordination message including the generated sidelink assistance information based at least in part on the request.

29. An apparatus for wireless communication at a user equipment (UE), comprising:
a processor;
memory coupled with the processor; and
instructions stored in the memory and executable by the processor to cause the apparatus to:
transmit a request for sidelink assistance information following an initial transmission of a sidelink communication over a sidelink resource of a sidelink resource pool, wherein the sidelink assistance information is associated with an interference condition associated with the initial transmission;
receive an inter-UE coordination message including the sidelink assistance information based at least in part on the request, the sidelink assistance information including information associated with the interference condition associated with the initial transmission of a sidelink communication over a sidelink resource of a sidelink resource pool, wherein the initial transmission occurs prior to receiving the inter-UE coordination message;
receive a retransmission of the sidelink communication; and
decode the received retransmission of the sidelink communication based at least in part on the received inter-UE coordination message including the sidelink assistance information.

* * * * *